(12) United States Patent
Kim et al.

(10) Patent No.: US 12,422,513 B2
(45) Date of Patent: Sep. 23, 2025

(54) METHOD AND APPARATUS FOR THE DIRECTIVE DIRECTION FINDING

(71) Applicant: ELECTRONICS AND TELECOMMUNICATIONS RESEARCH INSTITUTE, Daejeon (KR)

(72) Inventors: Kang Hee Kim, Daejeon (KR); Byung Chan Kim, Daejeon (KR); Haeng Sook Ro, Daejeon (KR); Gwang Moon Park, Daejeon (KR); Soo Ho Sohn, Daejeon (KR); Ki Cheol Tae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 814 days.

(21) Appl. No.: 17/691,593

(22) Filed: Mar. 10, 2022

(65) Prior Publication Data

US 2022/0381867 A1 Dec. 1, 2022

(30) Foreign Application Priority Data

Feb. 17, 2021 (KR) .................. 10-2021-0021428
Jan. 27, 2022 (KR) .................. 10-2022-0012137

(51) Int. Cl.
*G01S 3/42* (2006.01)
*G01S 3/04* (2006.01)
*G01S 3/74* (2006.01)

(52) U.S. Cl.
CPC ............... *G01S 3/42* (2013.01); *G01S 3/043* (2013.01); *G01S 3/74* (2013.01)

(58) Field of Classification Search
CPC ............... G01S 3/42; G01S 3/43; G01S 3/74
USPC ........ 342/445, 449, 451, 458, 378, 417, 196
See application file for complete search history.

(56) References Cited

U.S. PATENT DOCUMENTS

| 6,704,557 | B1 | 3/2004 | Krishnamurthy et al. |
| 9,551,777 | B2 | 1/2017 | Stoddard |
| 2004/0109521 | A1 | 6/2004 | Jeong |
| 2012/0280874 | A1 | 11/2012 | Kim |
| 2016/0226570 | A1* | 8/2016 | Nicholls ............... H04B 7/0897 |

FOREIGN PATENT DOCUMENTS

| KR | 20000077064 A | 12/2000 |
| KR | 20050040452 A | 5/2005 |
| KR | 20110071818 A | 6/2011 |
| KR | 20160032144 A | 3/2016 |
| WO | 2021/240518 A1 | 12/2021 |

* cited by examiner

*Primary Examiner* — Bo Fan
(74) *Attorney, Agent, or Firm* — Rabin & Berdo, P.C.

(57) ABSTRACT

A directive direction finding apparatus may comprise: a directivity-enabled antenna array in which a constituent antenna or antenna subarray has directivity in the same direction; an RF/IF receiver connected to the directivity-enabled antenna array; a digital receiver connected to the RF/IF receiver; a direction finder connected to the digital receiver; a directivity control unit to control an operation of the directivity-enabled antenna array; and a transport/control interface connected to the direction finder and to manage control and operation of the directivity-enabled antenna array, the RF/IF receiver, the digital receiver, the direction finder and the directive control unit.

18 Claims, 27 Drawing Sheets

METHOD AND APPARATUS FOR THE DIRECTIVE DIRECTION FINDING

CROSS-REFERENCE TO RELATED APPLICATIONS

This application claims priority to Korean Patent Applications No. 10-2021-0021428 filed on Feb. 17, 2021, and No. 10-2022-0012137 filed on Jan. 27, 2022 with the Korean Intellectual Property Office (KIPO), the entire contents of which are hereby incorporated by reference.

BACKGROUND

1. Technical Field

The present disclosure relates to a direction finding technology, and more particularly, to a method and apparatus for finding the direction of propagation of a specific frequency radio signal by limiting a space to which an antenna is directed.

2. Related Art

A conventional direction finding system for detecting a direction of propagation of a specific frequency radio signal is configured of an antenna unit, a radio frequency/intermediate frequency (RF/IF) signal processing unit, a digitizer, a digital signal processing unit, and an interface (I/F) unit.

For example, as shown in FIG. 1, it is configured to include an antenna array, an RF/IF receiver connected to the antenna array, a digital receiver connected to the RF/IF receiver, a direction finder connected to the digital receiver, and a transport/control interface that manages the controls and operations of the components and is connected to the direction finder. The digital receiver includes a digitizer and optionally incudes a filter or a processor.

The direction finding system estimates the angle of arrival (AoA) of a specific frequency radio signal for direction finding. For this estimation, the antenna unit usually requires an omnidirectional antenna (refer to FIG. 2) composed of a plurality of antennas, and may be configured using a directional antenna with a pattern as shown in FIG. 4 and FIGS. 5A and 5B depending on the purpose. The theoretical reception gain and 360° pattern of the omnidirectional antenna are as illustrated in FIG. 3.

A single directional antenna may be used to detect the direction of an incoming signal. In this case, the direction finding system uses the directional reception pattern of the directional antenna. That is, in a situation where it is not known which direction the signal is coming from, the direction finding system has to detect the angle of arrival of the radio signal by directing the direction of the antenna step by step up to 360° in the azimuth direction with respect to the entire detection area due to its characteristics.

As such, the method of physically oriented with respect to the finding area in some direction or the entire direction requires a time, and there is a problem in that the incoming signal source must exist during the corresponding time. In addition, in most patterns of the directional antennas, width of the main beam do not have a narrow enough to estimate the exact direction of the incoming signal, so the antenna unit of most direction finding systems that value accuracy uses an antenna array composed of a plurality of antenna elements that can receive in all directions. In the antenna array using a plurality of antenna elements, a direction finding algorithm for classifying directions in a super-resolution method is sometimes used.

On the other hand, a direction finding system using an antenna array composed of N antennas can theoretically find a maximum of (N−1) signal sources. However, in a real environment, in order to stably and simultaneously perform direction finding of two or more signal sources, an antenna array is required to compose of more many antenna elements.

In addition, when the existence time of a signal source is short and a corresponding frequency band is shared by many devices, the number of signal sources existing in a specific time period is large. In order to stably separate these signal sources and find a specific signal source, dozens or more of antenna units are required and RF/IF receivers and digitizers corresponding to the antenna units are required.

Moreover, the processing of the direction finding signal corresponding to the required plurality of antennas and reception channels increases complexity in the form of a series of the number of antennas (N), and the required system requirements are also increased. In such a situation, when a target signal source appears, there is a problem in that the direction finding system requires an unnecessarily high specification in order to achieve the purpose by finding the corresponding signal source, and therefore, there is a problem in that the success probability for direction finding is significantly lowered in a system that is not designed with high specifications. Besides, when similar signal sources exist at the same time, there is a problem in that the probability of failing direction detection increases significantly because the signal sources are not sufficiently processed for a predetermined time in the process of signal processing them.

SUMMARY

The present disclosure has been derived to solve the above problems, and an object of the present disclosure is to provide a method and apparatus for the directive direction finding, which capable of finding a direction even with a relatively small number of receiver channels by spatially limiting the total signal sources incoming to an antenna array to reduce the sources of interference.

Another object of the present disclosure is to, in a simultaneous incident environment in which multiple signal sources need to be processed by high processing performance, provide a directive direction finding method and apparatus, capable of effectively finding a direction of a radio signal even with the limited system performance, by using a directive direction finding scheme that limits a specific frequency radio signal in a specific direction.

The objects and advantages of the present disclosure may be understood by the following description, and will be more clearly understood by the embodiments of the present disclosure. Moreover, it will be readily apparent that the objects and advantages of the present disclosure can be realized by the means and combinations thereof indicated in the claims.

According to an exemplary embodiment of the present disclosure, a directive direction finding apparatus may comprises: a directivity-enabled antenna array in which constituent antennas or antenna subarrays have directivity in the same direction; an RF/IF receiver connected to the directivity-enabled antenna array; a digital receiver connected to the RF/IF receiver; a direction finder connected to the digital receiver; a directivity control unit for controlling an operation of the directivity-enabled antenna array; and a transport/control interface connected to the direction finder, the transport/control interface managing control and operation of the directivity-enabled antenna array, the RF/IF receiver, the digital receiver, the direction finder and the directive control unit.

The directivity-enabled antenna array may include a plurality of directional antennas and may be arranged to spatially limit a signal source incident in the same direction on the directivity-enabled antenna array.

The directivity control unit may perform at least any one or more of direction control of the directivity-enabled antenna array, directivity control of individual directivity antenna element of the directivity-enabled antenna array, and frequency selection control of the directivity-enabled antenna array to limit a direction finding space.

The directivity control unit may perform at least any one or more of direction control of the directivity-enabled antenna array, directivity control of individual directivity antenna element of the directivity-enabled antenna array, and frequency selection control of the directivity-enabled antenna array to target and track a specific signal source in an entire detection finding space.

The directivity-enabled antenna array may include a plurality of shared subarrays, in which each subarray includes a plurality of directional antennas.

The directivity control unit may further include a switch matrix connected between a plurality of single antennas and a plurality of subarray modules, and the switch matrix may support multiple subarrays to share at least some single antennas.

The directivity control unit may further include a first buffer distributor disposed between a plurality of subarrays and a plurality of receivers which is connected to a plurality of single antennas and which converts an analog signal to a digital signal.

The directivity control unit may further include a second buffer distributor disposed between the plurality of subarrays and a plurality of direction finding modules.

The directivity control unit may be a signal processing unit for the directivity-enabled antenna array, and may include a phase control unit and a signal integrator for controllable directivity. The phase control unit and the signal integrator may be configured as a switch matrix.

The directivity control unit may dispose antennas for different frequencies of several bands for simultaneous support of various frequency bands in the subarray, and may further include a frequency controller for selecting at least one or more of the antennas. The frequency controller may be included in the directivity control unit.

The directive direction finding apparatus may further comprise an antenna base for slantingly arranging a plurality of rows formed by single antennas of the directivity-enabled antenna array.

The antenna base may include a triangular pyramid shape, a quadrangular pyramid shape or a cone shape.

The directive direction finding apparatus may further comprise an omnidirectional antenna array disposed adjacent the directivity-enabled antenna array.

The directivity-enabled antenna array and the omnidirectional antenna array may be arranged to face parallel to a signal source positioned in a direction limited to a direction finding space.

The directive direction finding apparatus may further comprise a reflector disposed between the directivity-enabled antenna array and the omnidirectional antenna array.

The directivity-enabled antenna array and the omnidirectional antenna array may be arranged in a row or overlapping with respect to a signal source positioned in a direction limited to a direction finding space.

The directive direction finding apparatus may further comprise a reflector disposed adjacent to the directivity-enabled antenna array to reflect a radio signal in an undesired direction to an outside.

The directive direction finding apparatus may further comprise a driving means which is connected to the directivity-enabled antenna array and which tilts the directivity-enabled antenna array in a vertical direction or rotates the directivity-enabled antenna array in a horizontal direction, the driving means including an actuator or motor.

The directivity-enabled antenna array may include a multidirectional antenna module as a single antenna.

According to another exemplary embodiment of the present disclosure, a directive direction finding method performed by a directive direction finding apparatus may comprise the steps of: disposing a directivity-enabled antenna array such that a plurality of constituent antennas or antenna subarrays have directivity in the same direction; controlling the directivity-enabled antenna array to direct a specific direction finding space among an entire direction finding space; and processing a specific frequency radio signal incident in the specific detection finding space to find a direction of the signal.

DETAILED DESCRIPTION OF THE EMBODIMENTS

Figure 1:
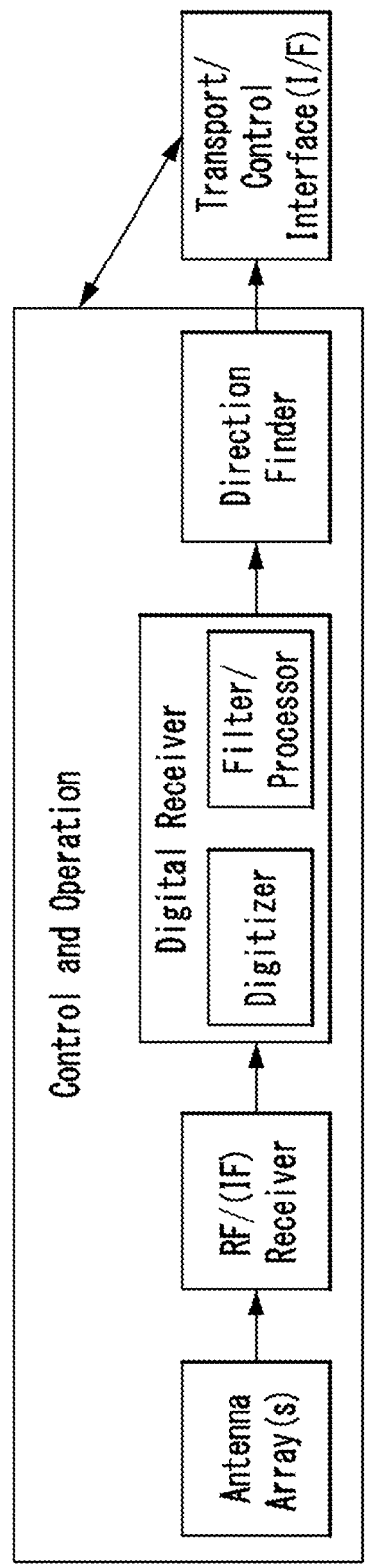
FIG. 1 is a block diagram illustrating a typical direction finding system.
Figure 2:
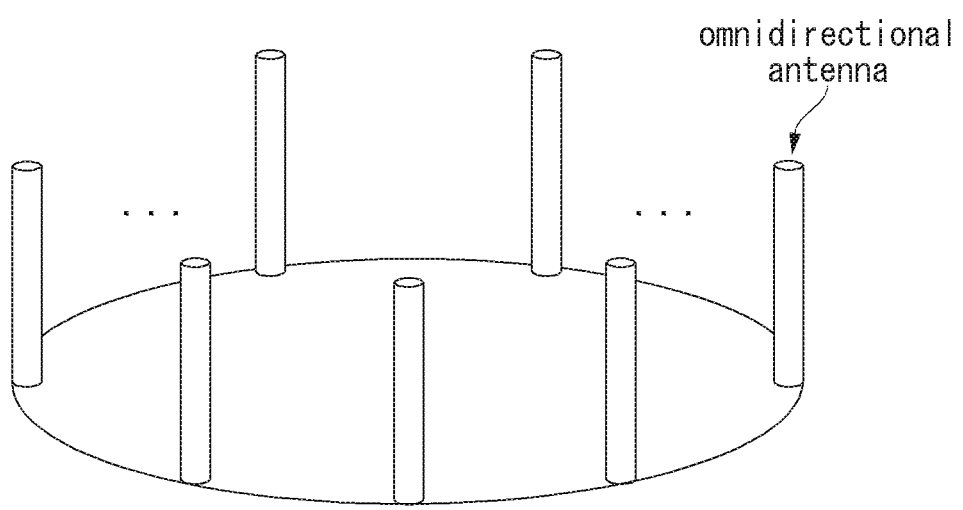
FIG. 2 is a conceptual diagram illustrating an antenna array composed of an omni-directional antenna of a comparative example.
Figure 3:
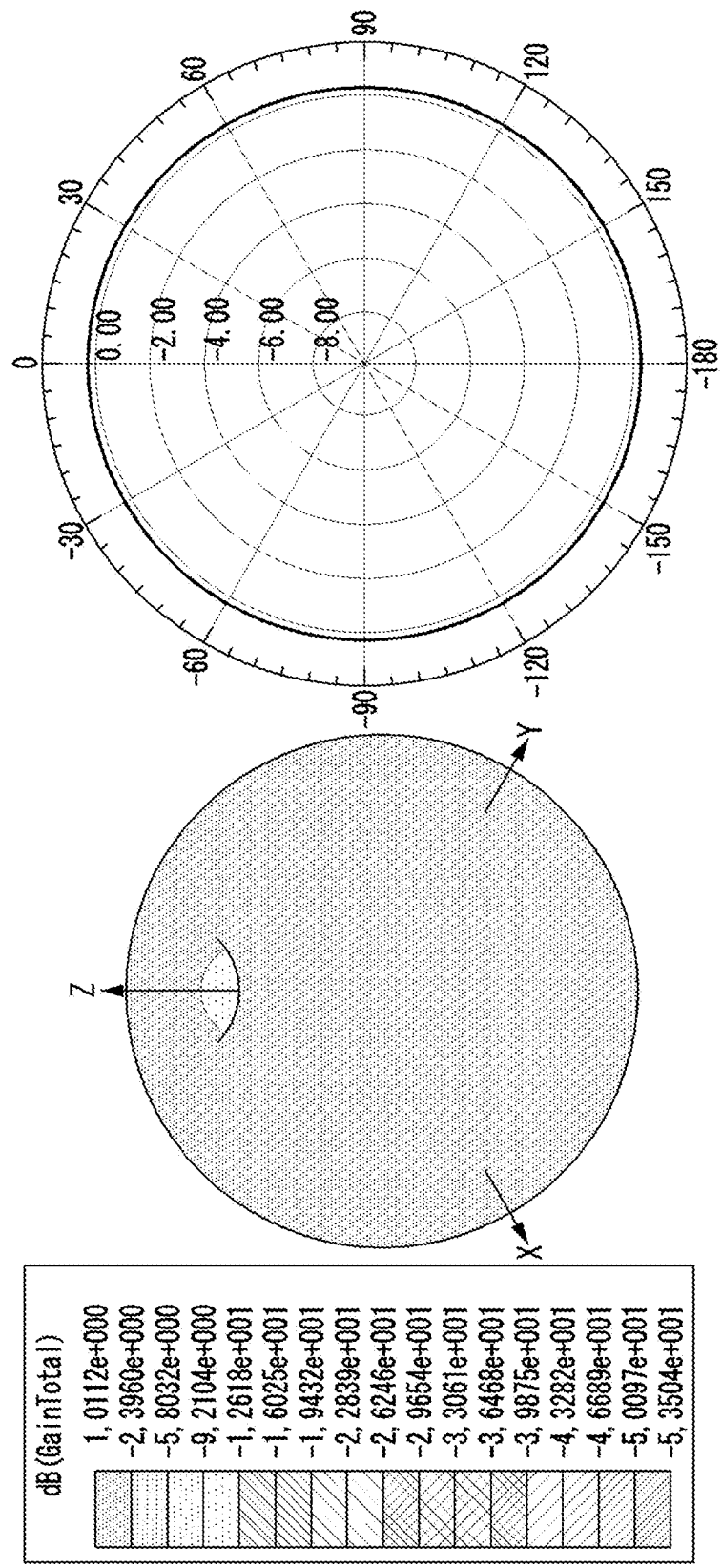
FIG. 3 is a diagram illustrating a theoretical reception gain of the omni-directional antenna of FIG. 2.
Figure 4:
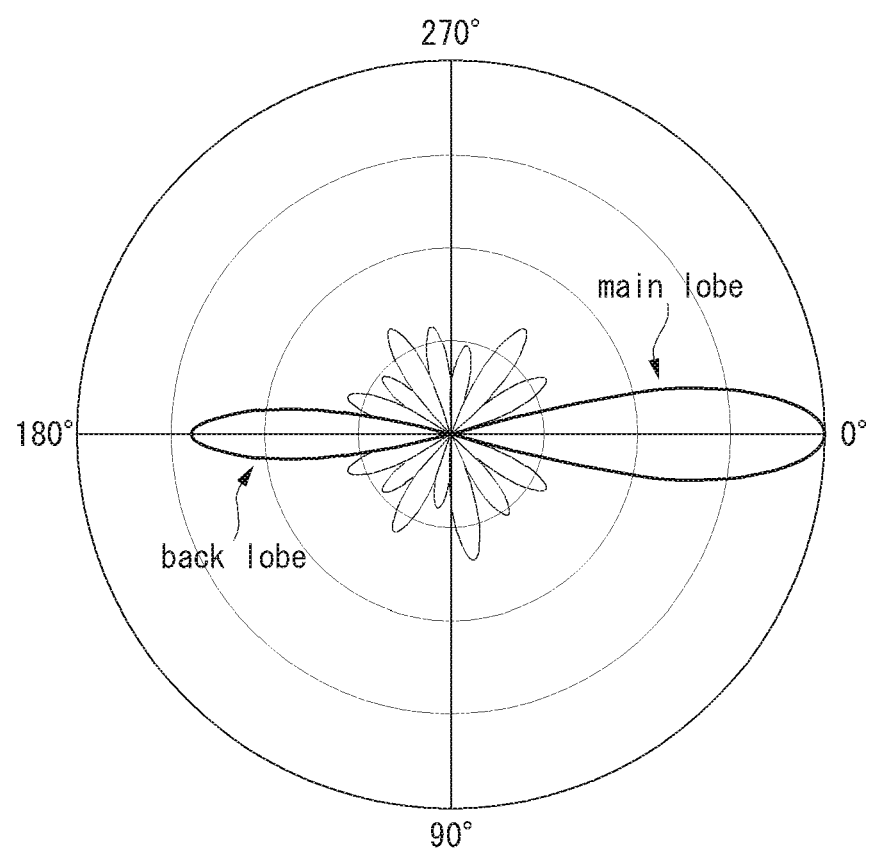
FIG. 4 is a diagram illustrating a 360° pattern of a directional antenna of a comparative example.
Figure 5A:
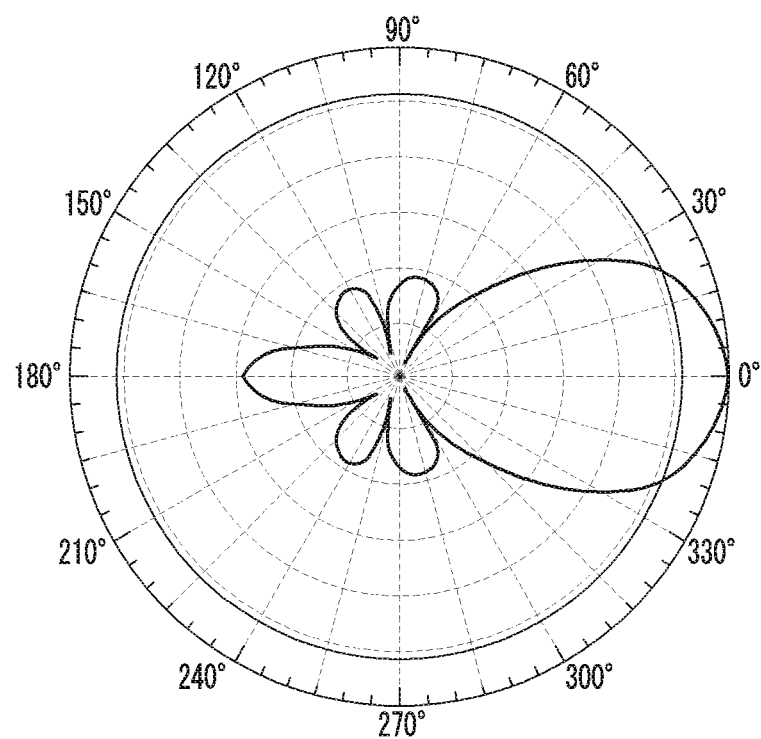
FIGS. 5A and 5B are diagrams illustrating a vertical pattern and a horizontal pattern for a 360° pattern of the directional antenna of FIG. 4.
Figure 5B:
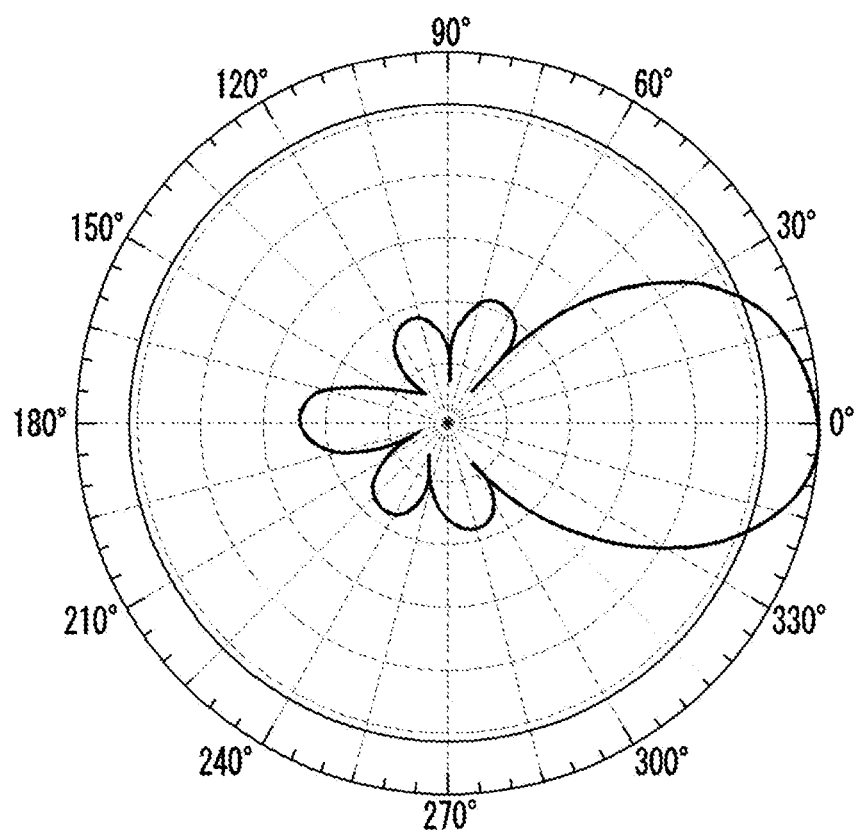

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may mean "at least one of A or B" or "at least one of combinations of one or more of A and B". Also, in exemplary embodiments of the present disclosure, "one or more of A and B" may mean "one or more of A or B" or "one or more of combinations of one or more of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may be used in the same sense as a communication network.

Hereinafter, preferred exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

Figure 6:
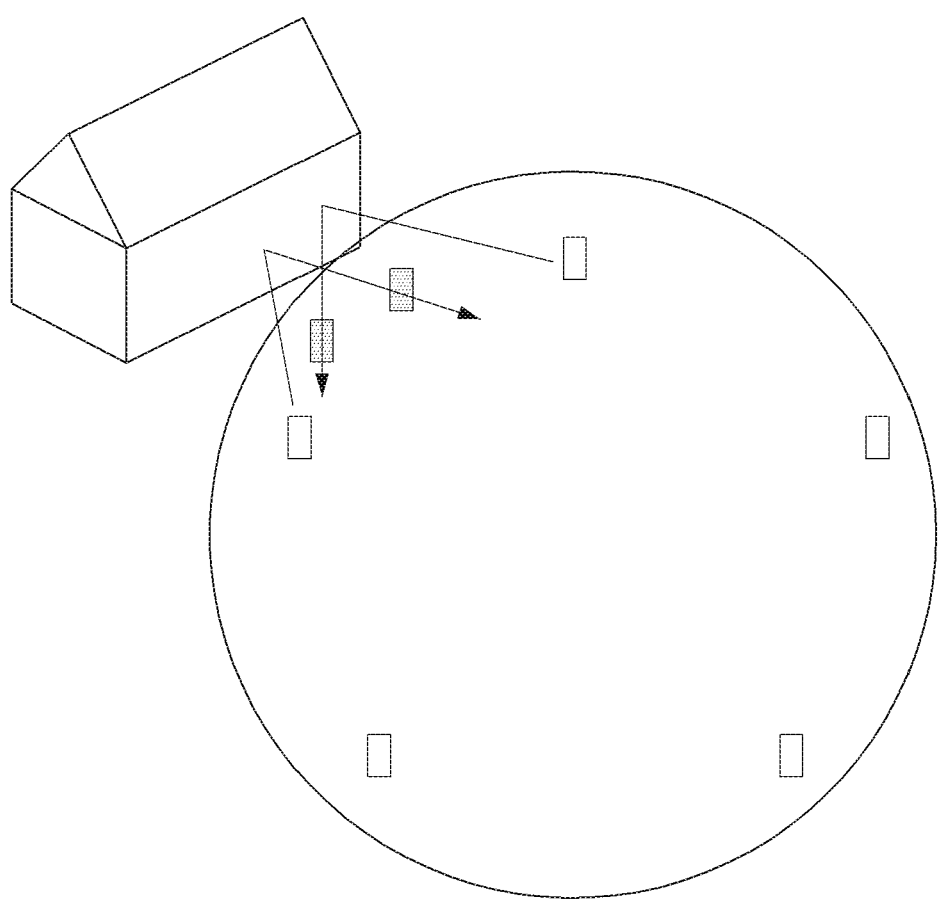
FIG. 6 is a conceptual diagram for explaining signal sources existing in a direction finding area, which is considered in a directive direction finding method according to an embodiment of the present disclosure.
Figure 7:
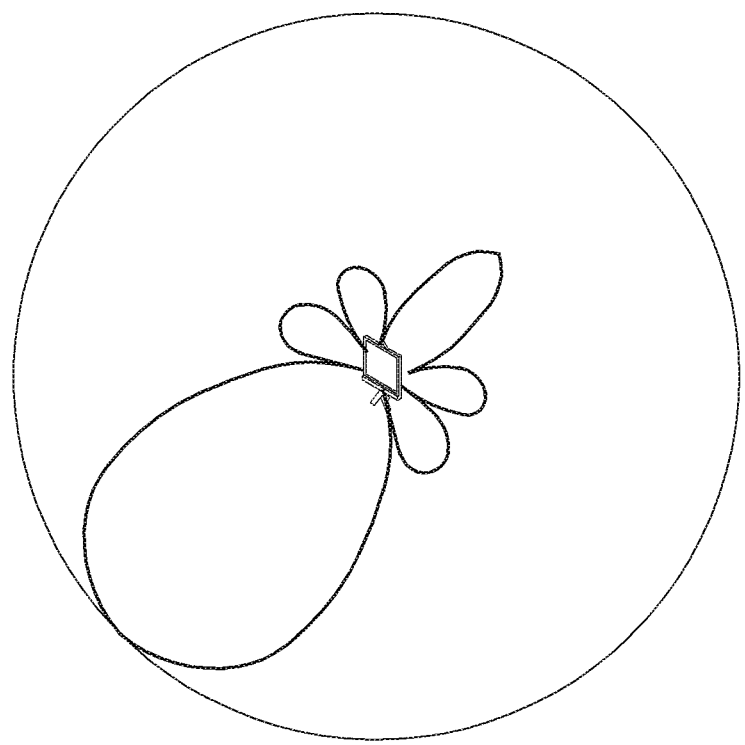
FIG. 7 is a conceptual diagram illustrating a single directional antenna pattern that can be employed in a directive direction finding apparatus according to an embodiment of the present disclosure.
Figure 8:
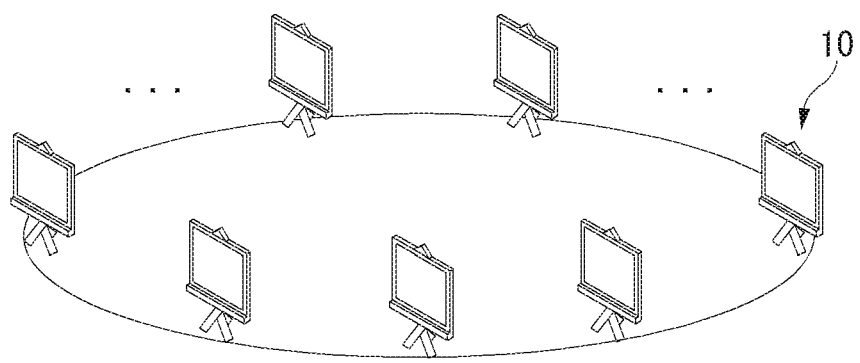
FIG. 8 is a conceptual diagram of an antenna array configured using a directional antenna, which can be employed in a directive direction finding apparatus according to an embodiment of the present disclosure.

FIG. 6 is a conceptual diagram for explaining signal sources existing in a direction finding area, which is considered in a directive direction finding method according to an embodiment of the present disclosure. FIG. 7 is a conceptual diagram illustrating a single directional antenna pattern that can be employed in a directive direction finding apparatus according to an embodiment of the present disclosure. FIG. 8 is a conceptual diagram of an antenna array configured using a directional antenna, which can be employed in a directive direction finding apparatus according to an embodiment of the present disclosure.

As shown in FIG. 6, it can be assumed that many signal sources (square boxes) exist, some of which are also signals generated as strong reflected waves by the surrounding environment. In such a situation where there are many signal sources, the actual signal sources may be transmitting at the same time, but in reality, even if the signals do not overlap with each other, they exist within a specific time window, so that there are situations that may affect direction finding, measurement, etc. of a terminal or a direction finding apparatus (shaded square boxes). In addition, a range in which it is difficult to completely separate from the viewpoint of not only time but also a frequency filter, or a situation in which several signals are incident from the viewpoint of a given system design, may be assumed as a situation in which many signal sources exist.

In order to accurately find the direction with existing technology in the above environment, it is necessary to use a system including a high-performance signal processing technique that can distinguish similar signals while using a direction finding system composed of an antenna array with a number far exceeding the total number of signal sources. In addition, in a wireless channel environment in a city center or when the number of such target signals increases due to a wider frequency band, the number of necessary antennas and receiver channels increases exponentially, and correspondingly, signal processing with exponentially increased complexity is required.

Therefore, in order to solve the problem as described above, in this embodiment, a signal source incident on the antenna is spatially limited by using a directional antenna as shown in FIG. 7 (see the antenna placed in the center of the circle), so that it is possible to provide a system capable of finding the direction of a target signal source while using a small number of antennas and receiver channels.

For example, as shown in FIG. 8, for the direction finding of a signal source existing in a direction finding area, a system in which an existing omnidirectional antenna is replaced with a directional antenna 10 may be considered.

That is, when the directional antenna array including a plurality of directional antennas 10 is oriented in the same direction, it has the effect of spatially limiting the target signal and has the advantage of being able to perform direction finding with the same density (relative to the total space) with a relatively small number of antenna and receiver channels. In addition, if the directional antenna array is used, there is an advantage in terms of targeting and tracking a specific signal source.

In this way, when the directive direction finding system is used, it is possible to control the directivity at any time. Such control may include all necessary operations required to control the direction of a physical antenna array or control the directivity of individual directional antenna elements. In addition, the frequency selection control function of the direction finding system may also be included in the directional antenna control.

Figure 9:
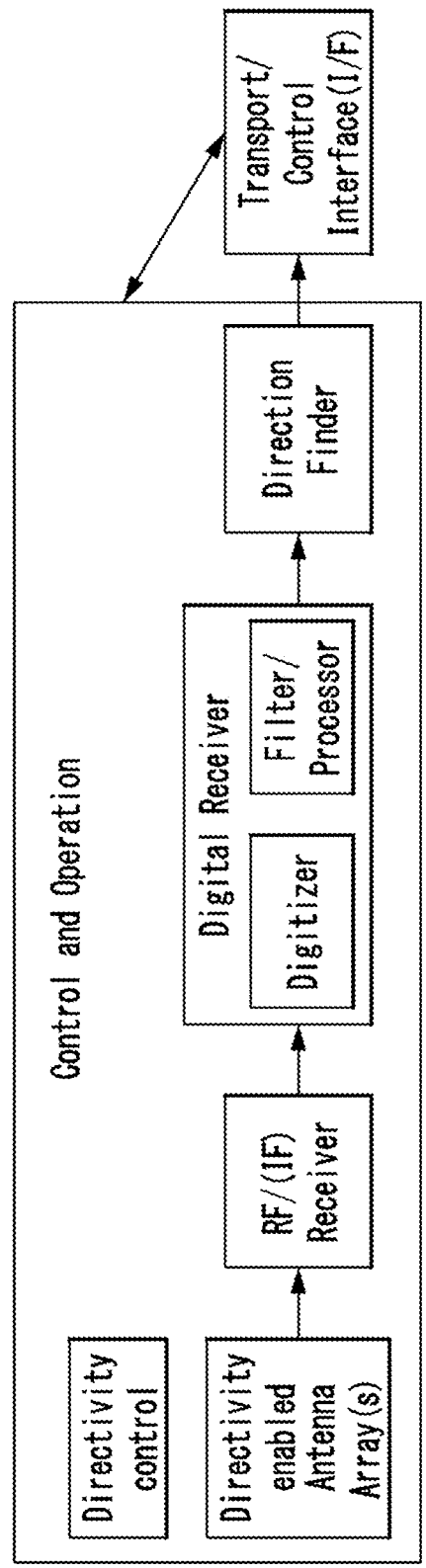
FIG. 9 is a schematic block diagram of a directive direction finding apparatus according to an embodiment of the present disclosure.
Figure 10A:
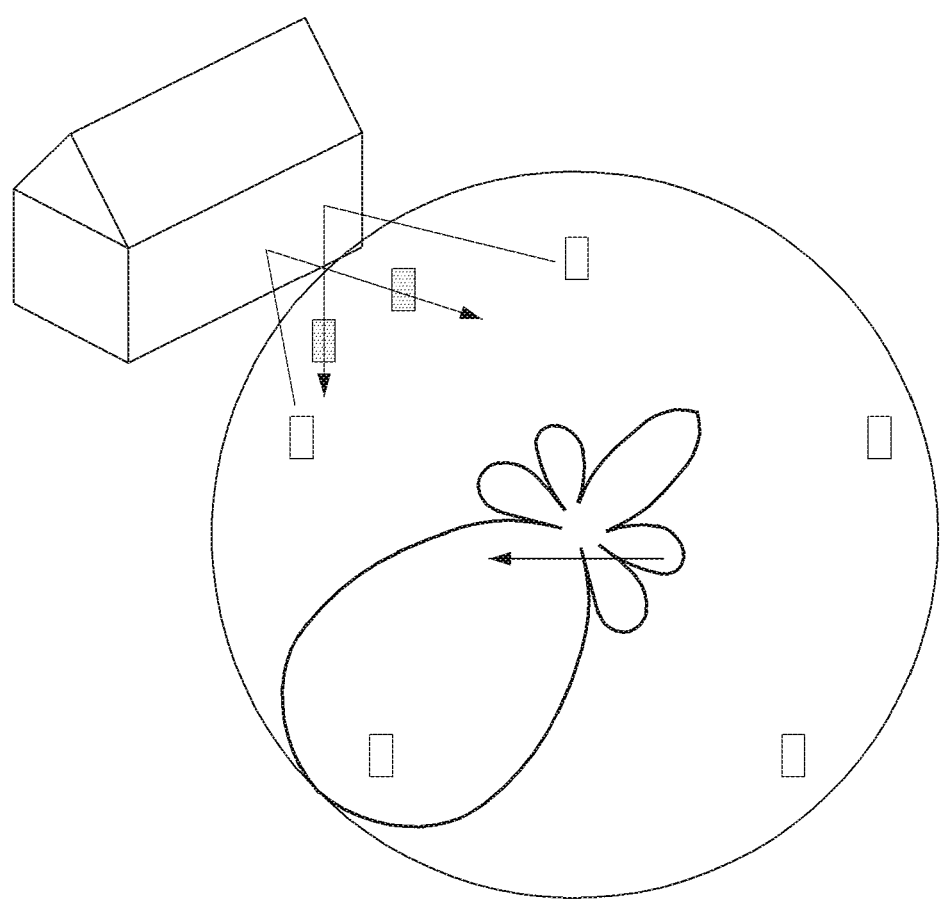
FIGS. 10A to 10C are conceptual views each showing a detection finding area oriented using a directional antenna array in the directive direction finding apparatus of FIG. 9.
Figure 10B:
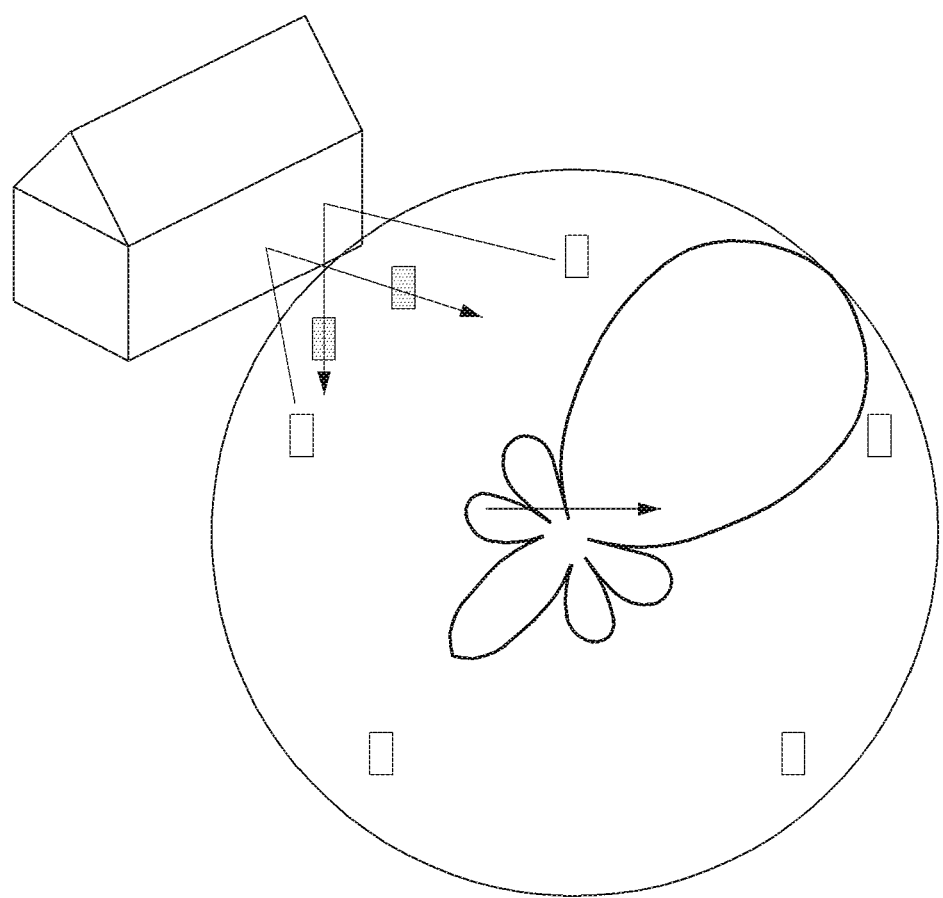
Figure 10C:
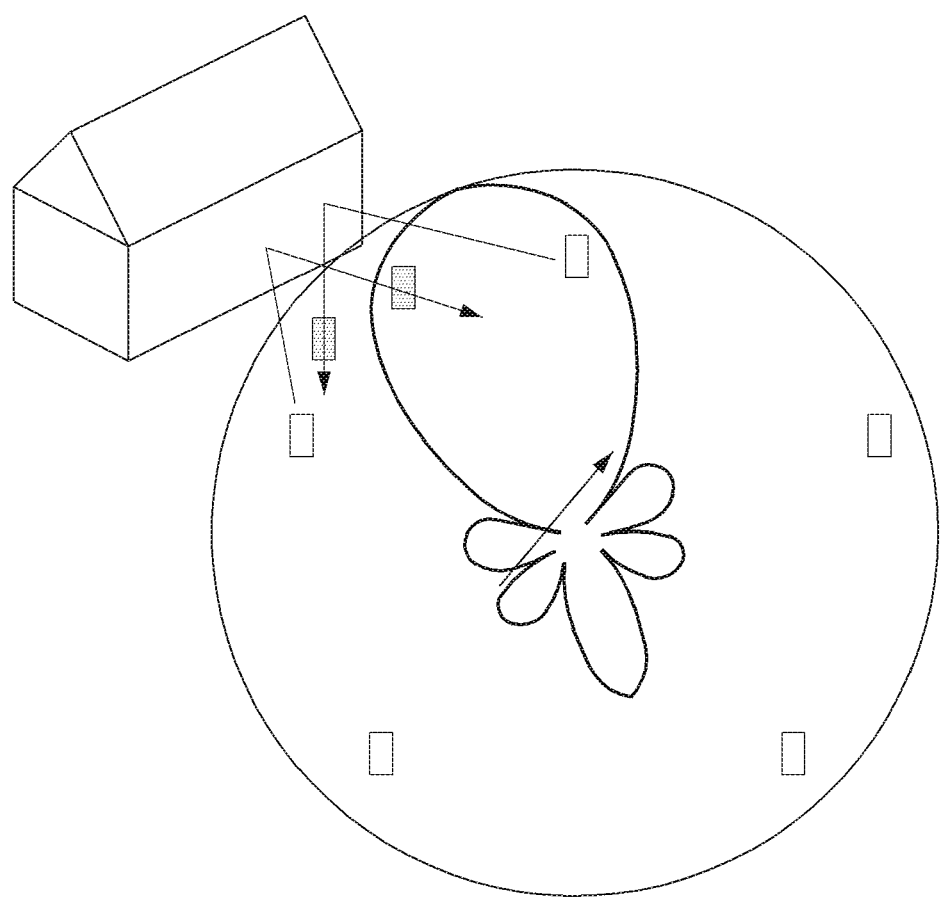

FIG. 9 is a schematic block diagram of a directive direction finding apparatus according to an embodiment of the present disclosure. FIGS. 10A to 10C are conceptual views each showing a detection finding area oriented using a directional antenna array in the directive direction finding apparatus of FIG. 9.

Referring to FIG. 9, the directive direction finding apparatus includes a directivity-enabled antenna array, an RF/IF receiver connected to the directivity-enabled antenna array, a digital receiver connected to the RF/IF receiver, a direction finder connected to the digital receiver, a directivity control unit and a transport/control interface connected to each of them and the direction finder to manage their control and operation. The digital receiver may be provided with a digitizer and a filter/processor.

The directive direction finding system may estimate an angle of arrival (AoA) of a specific frequency radio signal or find a direction of a specific frequency radio signal through a directivity-enabled antenna array, as shown in FIGS. 10A to 10C. In this case, the directivity-enabled antenna array is arranged to limit the direction finding space in the approximately 8 o'clock direction (see FIG. 10A), or to limit the direction finding space in the approximately 2 o'clock direction (see FIG. 10B), or to limit the direction finding space in the approximately 11:30 o'clock direction (see FIG. 10C), among the entire finding space indicated by a circle. In each of FIGS. 10A to 10C, an arrow in the center of a circle may correspond to an arrangement direction of the directivity-enabled antenna array.

In the case of using a directive direction finding apparatus, it is possible to control the directivity at any time, and such directivity control may include all operations necessary for directivity, such as control of a physical array direction or directivity control of individual directional antenna elements. In addition, the directivity control may include a frequency selection control function of the existing direction finding system in a broad sense.

According to this embodiment, by using a directivity-enabled antenna array, it is possible to have the effect of spatially limiting the target signal, and to perform effective direction finding for the same density, that is, the entire space with a relatively small number of antenna and receiver channels. In addition, there is an advantage in terms of targeting and tracking a specific signal source in the entire space.

Figure 11:
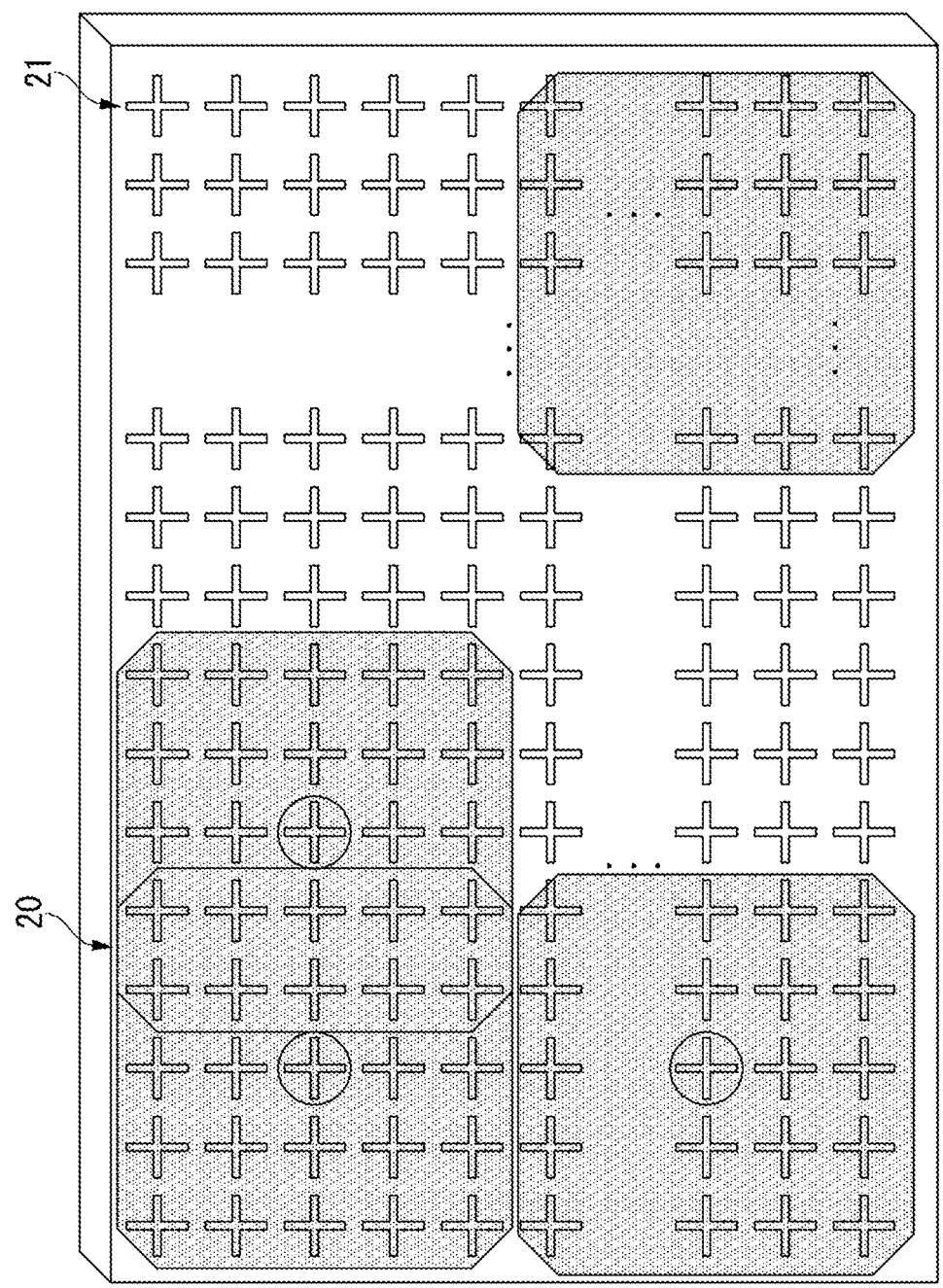
FIG. 11 is a conceptual diagram illustrating a structure in which a directional antenna is configured as a shared subarray, which can be employed in a directive direction finding apparatus according to another embodiment of the present disclosure.
Figure 12:
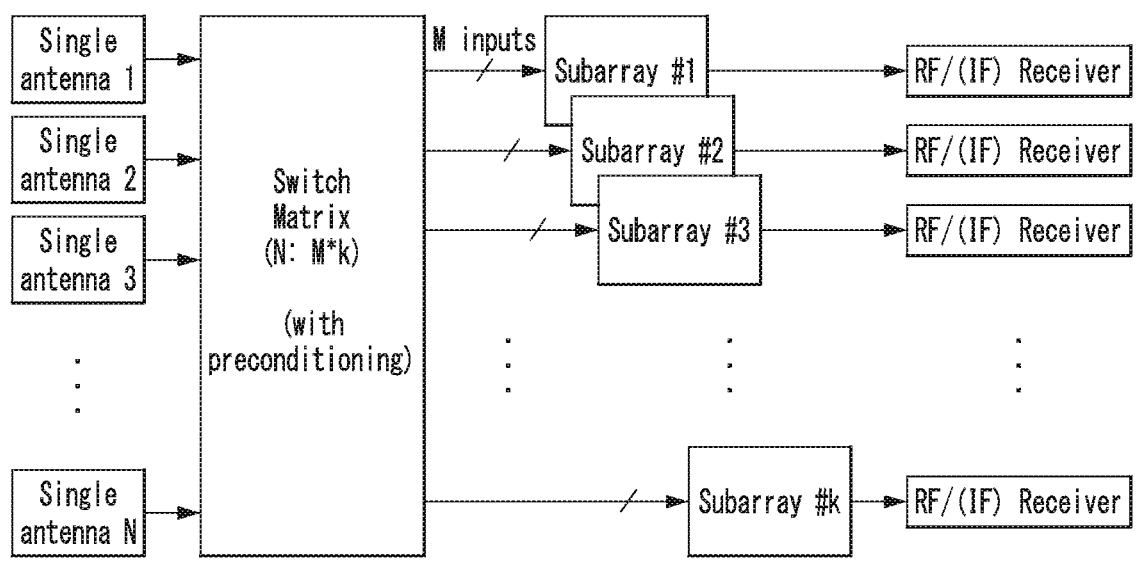
FIG. 12 is a configuration diagram for explaining a signal processing unit for the shared subarray of FIG. 11.
Figure 13:
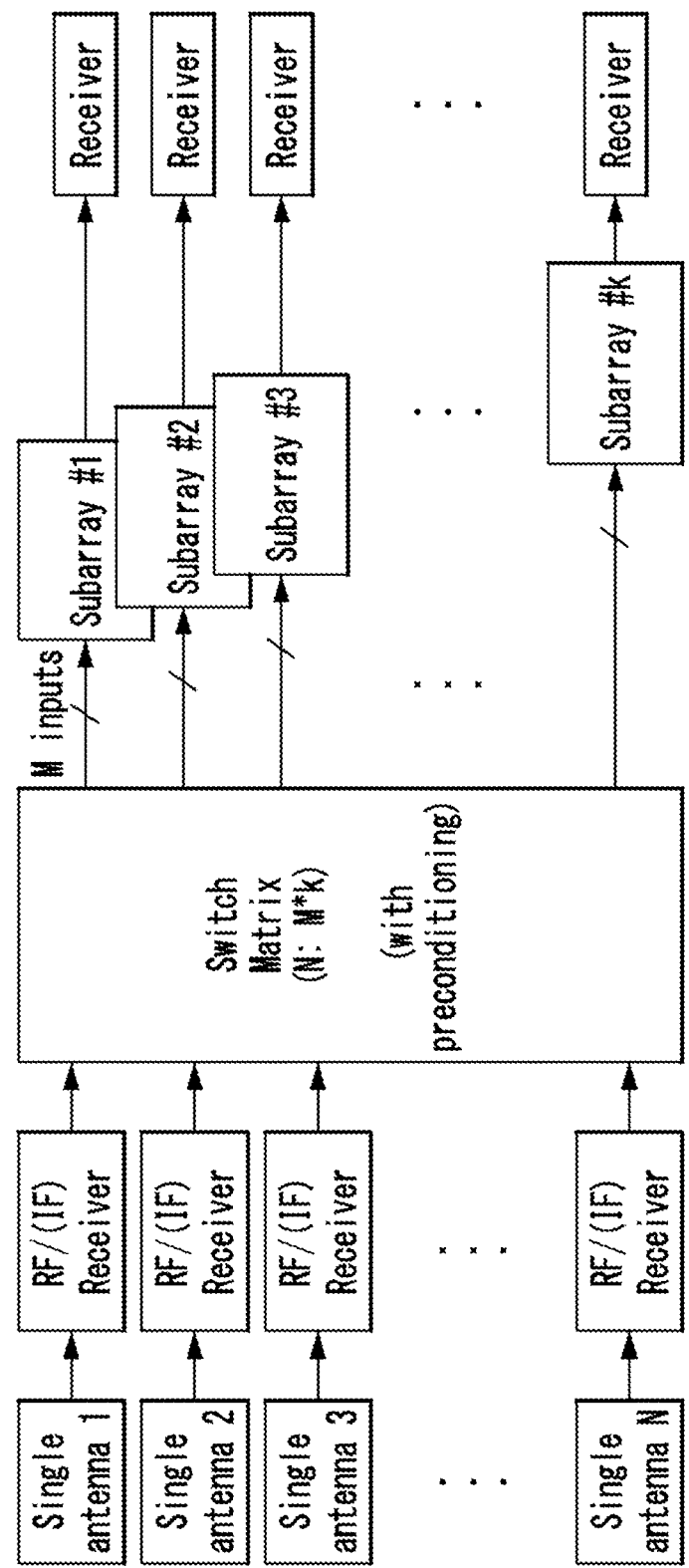
FIG. 13 is a configuration diagram for explaining another structure of a signal processing unit for the shared subarray of FIG. 11.
Figure 14:
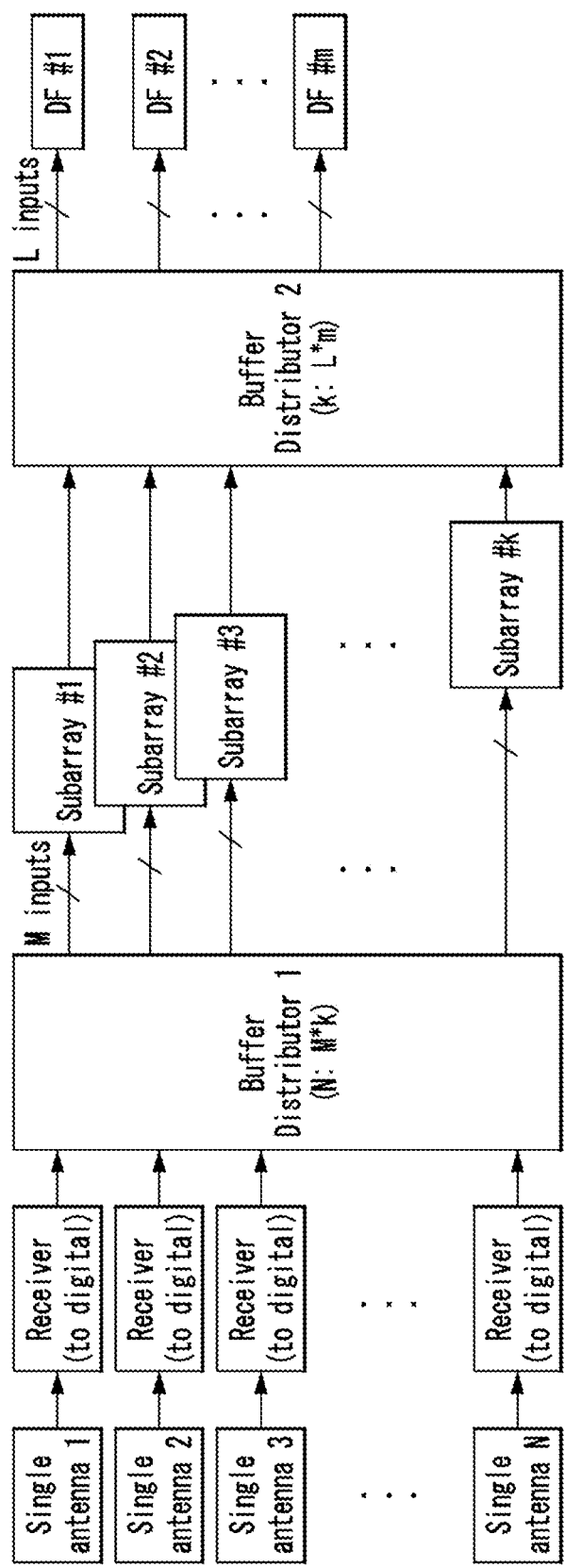
FIG. 14 is a configuration diagram for explaining another structure of a signal processing unit for the shared subarray of FIG. 11.

FIG. 11 is a conceptual diagram illustrating a structure in which a directional antenna is configured as a shared subarray, which can be employed in a directive direction finding apparatus according to another embodiment of the present disclosure. FIG. 12 is a configuration diagram for explaining a signal processing unit for the shared subarray of FIG. 11. FIG. 13 is a configuration diagram for explaining another structure of a signal processing unit for the shared subarray of FIG. 11. FIG. 14 is a configuration diagram for explaining another structure of a signal processing unit for the shared subarray of FIG. 11.

Referring to FIG. 11, the antenna array employed in the directive direction finding apparatus may include a plurality of subarrays 20, and each subarray may be configured with a plurality of directional antennas 21. In FIG. 11, a single subarray 20, a center of the single subarray block, or the antenna or direction finder (DF) positioned at the center is indicated by a circle. The subarray block can be expanded or reduced, and the position of the direction finder at the center thereof can be changed.

The output port of the subarray 20 is composed of one RF (radio frequency) port, and various methods for orientation can be applied to this subarray 20.

For example, when one directional antenna 21 is configured using multiple elements, a phase controller and a signal integrator may be included for controllable orientation, and it is also possible to actively perform phase control.

In addition, in consideration of the frequency range of the directional antenna, antennas for different frequencies of various bands can be arranged on the subarray 20 for simultaneous support of various frequency bands, and a frequency controller that selects such frequencies and, if necessary, a filter controller may be also included in the subarray 20.

Alternatively, as another method for configuring the subarray, there is a method for configuring an antenna array consisting of N antennas 21, grouping them to configure the subarray 20, and allowing the inputs of some antennas 21 to be shared. Since a large number of antennas 21 can be used in one subarray 20, directivity can be improved and reception gain can also be improved.

That is, in an array composed of a total of N antennas 21, the subarray 20 may be configured using M antennas, and one subarray 20 may be configured to provide one output. Although this implementation has a higher complexity than a modular subarray, it has the effect of overcoming various limitations in designing an array shape that is advantageous for an antenna arrangement space and DF. Also, there is an advantage in that directionality in several directions can be secured at the same time depending on the implementation method.

Although the subarray group is expressed only partially overlapping in FIG. 11, it is also possible to configure a subarray in a different direction using the same antenna input. FIGS. 12 to 14 show some examples of this.

Referring to FIG. 12, the directive direction finding apparatus provided with the directivity-enabled antenna array and the directivity control unit may be configured with N single antennas (1 to N) constituting a plurality of subarrays (subarrays #1 to #k) in M units, and may have a form in which one RF output for each subarray is transmitted to an RF/IF receiver. The plurality of subarrays (subarray #1 to #k) may be referred to as a subarray module and may be connected to the subarray processing unit.

Here, a switch matrix may be provided so that some single antennas can be shared by several subarrays. The switch matrix may be configured to precondition the signal received from the N single antennas (single antennas 1 to N) and input to the subarrays (subarrays #1 to #k) in which the single antennas are grouped in M units.

According to this configuration, the output of the subarray is composed of a single RF output or a single input of a single RF receiver, so there is an advantage that can be implemented without major change of the existing system. In this case, the directivity control unit connected to the subarray may be configured to generate one directed RF signal by controlling the phase of the RF signal.

Referring to FIG. 13, the directive direction finding apparatus provided with the directivity-enabled antenna array and the directivity control unit may be configured to perform signal processing of specific band (IF) or baseband regardless of the original frequency of the signal through the RF/IF receiver that processes each input of N single antennas (single antenna 1 to N) up to RF/(or IF).

In this case, since there is little need to have different controls for each frequency, there is an effect that the subarray processing unit including a switch matrix and a plurality of subarrays (subarrays #1 to #k) has a simple structure. In this case, the subarray processing unit may generate a received signal by controlling the subarray through the signal processing of intermediate frequency (IF) or baseband, and may transmit the generated received signal to a receiver.

Referring to FIG. 14, the directive direction finding apparatus provided with the directivity-enabled antenna array and the directivity control unit may be configured to generate a subarray using a digital signal that has been digitized for each antenna in order to remove uncertainty and complexity of analog signal processing, and to perform direction finding based on the output signals of the subarray.

To this end, the directive direction finding apparatus may be configured to include N single antennas (single antenna 1 to N), a plurality of receivers connected to each single antenna to convert an input signal into a digital signal, respectively, a first buffer distributor (buffer distributor 1) connected to the plurality of receivers, a plurality of subarrays (subarray #1 to #k) connected to the first buffer distributor, a second buffer distributor (buffer distributor 2) connected to the plurality of subarrays, and a plurality of direction finders (DF #1 to #m) connected to the second buffer distributor. The direction finder may correspond to the direction finding module.

In this embodiment, instead of analog signal processing, it is possible to implement buffer control in which digital data is distributed to the subarray module, and the results of the subarray are grouped and input to the direction finding module. In addition, the directivity control unit or the directive direction finding apparatus having the same may perform synchronization of a receiver channel corresponding to the maximum number of antennas. According to the above configuration, there is an effect of omitting the switch matrix and the subarray generator or simplifying the structure thereof. The subarray generator may correspond to a directivity control unit coupled to the subarray.

Figure 15:
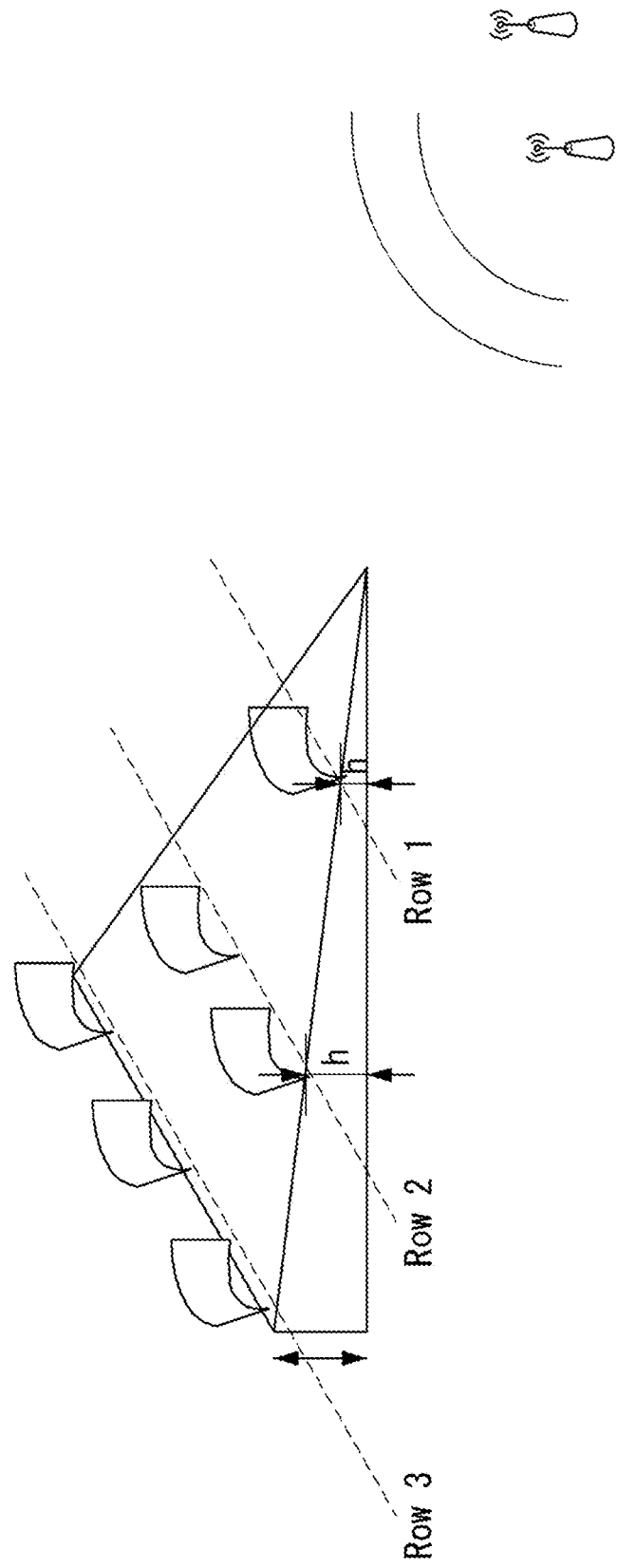
FIG. 15 is a conceptual diagram illustrating an antenna arrangement that is elevated as an antenna array that can be employed in a directive direction finding apparatus according to another embodiment of the present disclosure.
Figure 16:
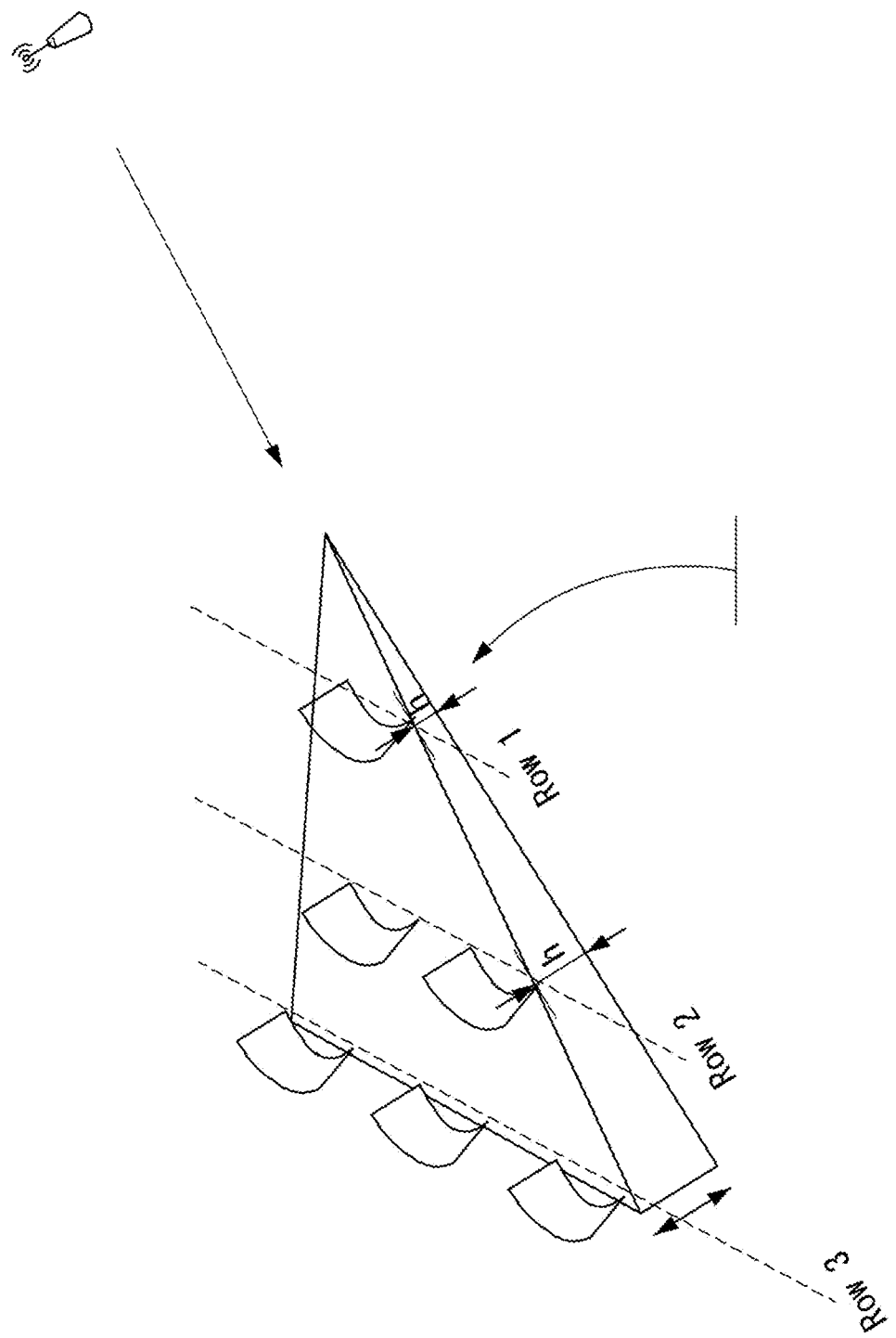
FIGS. 16 and 17 are conceptual diagrams for explaining physical control of an antenna array that can be employed in the directive direction finding apparatus of FIG. 15.
Figure 17:
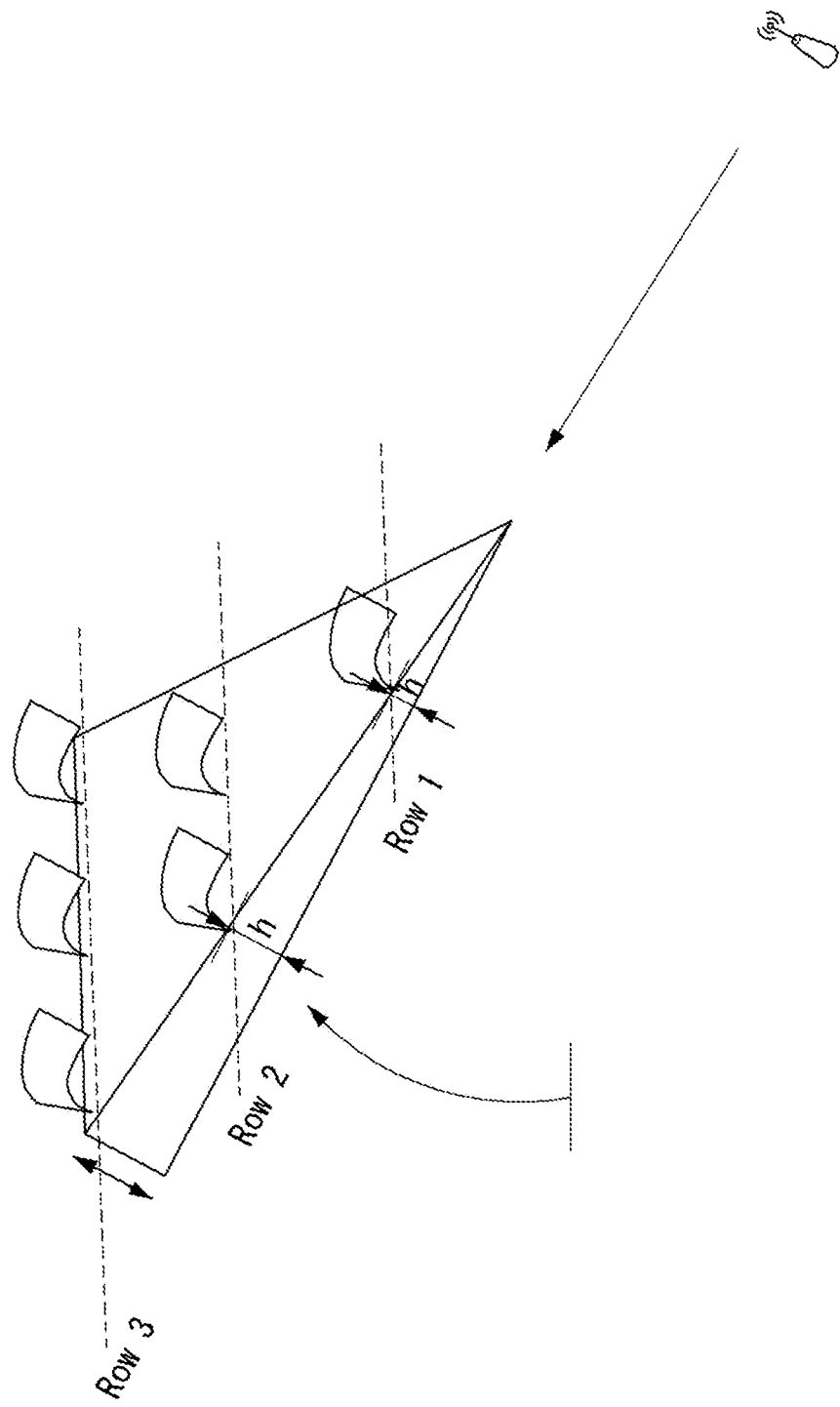
Figure 18:
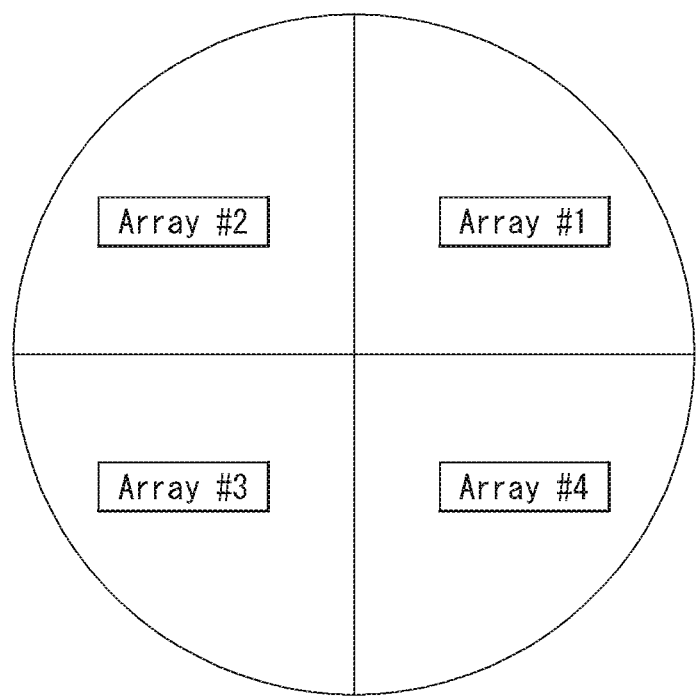
FIG. 18 is a schematic plan view of a structure in which a plurality of directive direction finding antenna arrays is arranged to serve as directive sector units, as a modified example of an antenna array that can be employed in the directive direction finding apparatus of FIG. 15.
Figure 19A:
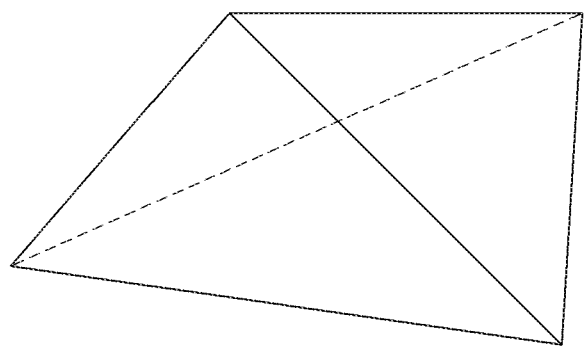
FIGS. 19A and 19B are schematic perspective views illustrating antenna bases in the form of a triangular pyramid and a quadrangular pyramid that can be employed in the antenna base to replace the physical motion of the antenna array of FIG. 18.
Figure 19B:
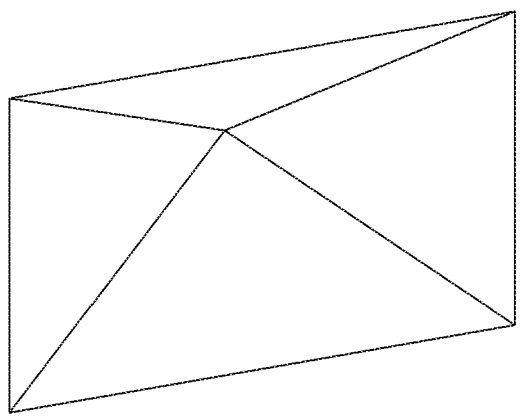

FIG. 15 is a conceptual diagram illustrating an antenna arrangement that is elevated as an antenna array that can be employed in a directive direction finding apparatus according to another embodiment of the present disclosure. FIGS. 16 and 17 are conceptual diagrams for explaining physical control of an antenna array that can be employed in the directive direction finding apparatus of FIG. 15. FIG. 18 is a schematic plan view of a structure in which a plurality of directive direction finding antenna arrays is arranged to serve as directive sector units, as a modified example of an antenna array that can be employed in the directive direction finding apparatus of FIG. 15. FIGS. 19A and 19B are schematic perspective views illustrating an antenna base in the form of a triangular pyramid and a quadrangular pyramid that can be employed in the antenna base to replace the physical motion of the antenna array of FIG. 18.

Referring to FIGS. 15 to 17, the directive direction finding apparatus may include an antenna array of an elevated antenna arrangement. To this end, the directive direction finding apparatus may include an antenna base.

That is, due to the characteristics of the directive antenna array, the need to simultaneously receive omnidirectional signals is low, so when arranging a directivity-enabled antenna array, the antenna array can be arranged so that a direction that can maximize the LoS (Line of Sight) with the signal source can be selected or limited.

For example, assuming that the antenna array is formed in rows of antennas near and far from the directing direction, a multi-row antenna arrangement in an elevated form may be formed. To this end, the directional antenna array may include an antenna base in which antenna rows are arranged in a row direction or a horizontal direction on an inclined surface. The antenna base is only a virtual base on which a plurality of antenna rows is mounted, and does not have to exist in one physical form.

For example, if a system is configured to perform direction finding of 360° in the azimuth direction, a single array must perform a physical rotation or other motion. Instead of such physical movement, a plurality of antenna arrays may be disposed and direction finding may be performed with a single direction finder using selector logic. In this case, it is also possible to design the selector so that each antenna array has a partially overlapping section.

FIG. 15 shows a structure in which the antenna row located far from a signal source is elevated by the inclined surface of the antenna base in the form of a flattened triangular pyramid with vertices on four surfaces with a gradual decrease in thickness. FIG. 16 shows a form in which the vertex of the antenna base of FIG. 15 is elevated to face the signal source. FIG. 17 shows a structure in which the rear surface located on the opposite side of the vertex of the antenna base of FIG. 15 is elevated and the straight line connecting the rear surface and the vertex is arranged to face the signal source.

According to the present embodiment, the antenna array in which multiple rows are three-dimensionally arranged using the antenna base is arranged to face the signal source, so that the direction of a specific frequency radio signal can be effectively found using the directional antenna array. This can have the effect of solving problems such as the time it takes for physical movement such as rotation of the antenna, complexity of hardware configuration, maintenance effort, and deterioration of signal reception performance due to structures.

In addition, by using vertical tilting of the antenna array to cope with the situation where the signal source is outside the vertical range designed by the inclination angle of the antenna base, it is possible to effectively limit the detection finding space for the signal source to find the direction of a specific frequency radio signal.

In addition, horizontal rotation may be additionally used in a single antenna or in an antenna array. Although FIG. 17 shows a configuration in which the antenna is disposed on the top of the inclined plane in the case of tilt down, it is also possible to place the antenna at the lower end of the inclined plane of the antenna base for the orientation of the inclined plane or the antenna base in consideration of the situation of finding in a low direction in the air, such as a drone.

In addition, by utilizing the case of selecting and using multiple antenna arrays, it is possible to select and use different antenna arrays with different target heights or directions by arranging a plurality of antenna arrays in a form that reflects tilt or rotation.

In addition, as shown in FIG. 18, it is possible to have a form in which the first to fourth antenna arrays (array #1, array #2, array #3, and array #4) are respectively arranged on each of the four inclined surfaces in the form of a quadrangular pyramid. Such a quadrangular pyramid-shaped antenna base FIG. 19A may be used instead of a conical shape or a triangular pyramid shape as shown in FIG. 19B.

Figure 20:
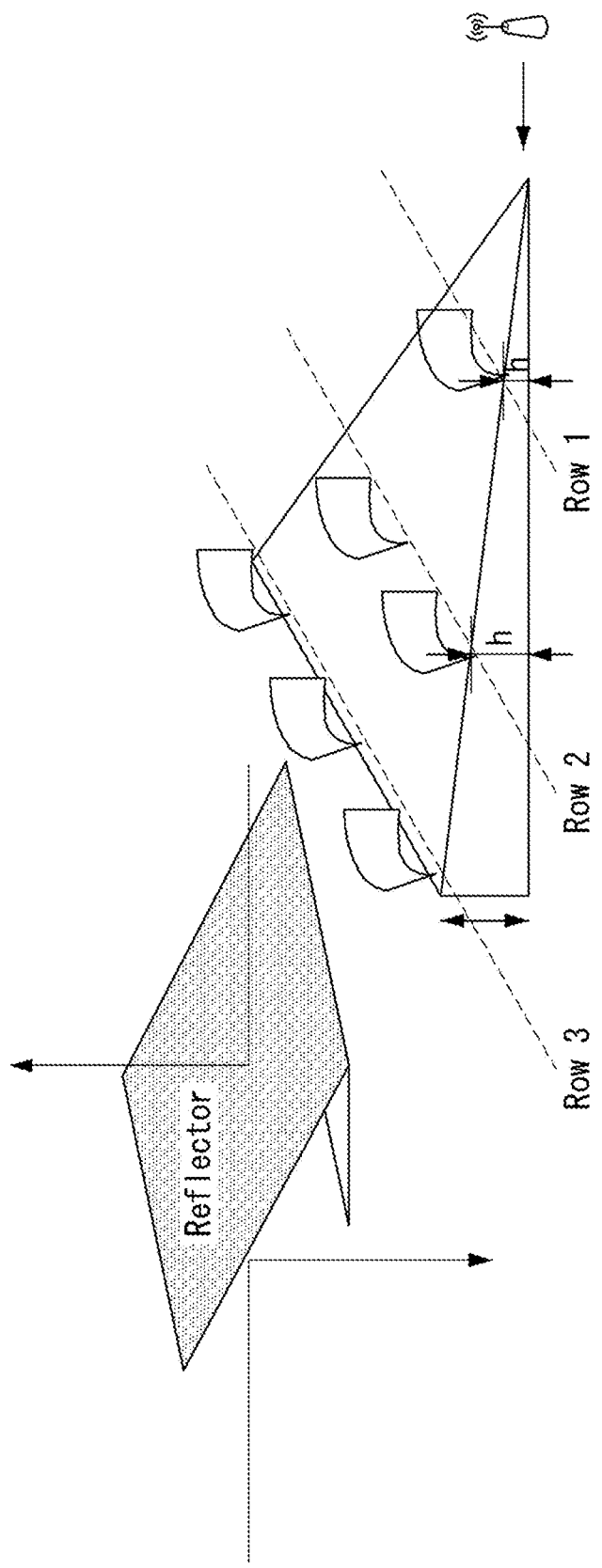
FIG. 20 is a conceptual diagram illustrating a structure in which a reflector is used together as an antenna array that can be employed in a directive direction finding apparatus according to another embodiment of the present disclosure.

FIG. 20 is a conceptual diagram illustrating a structure in which a reflector is used together as an antenna array that can be employed in a directive direction finding apparatus according to another embodiment of the present disclosure.

Referring to FIG. 20, an antenna array that can be employed in the directive direction finding apparatus may be implemented to be used together with a reflector.

That is, although the pattern of the directional antenna has an advantage in the gain in the directing direction, a wide-angle pattern and a beam in an undesired direction also tend to be generated due to design constraints such as size. When such a directional antenna needs to be used, in order to reduce the signal interference other than the directional direction, a reflector of a shape or location that has little influence on antenna reception can be used together.

In this embodiment, the reflector is disposed in an inclined shape at the rear end of the antenna array, and is designed to reflect the rear signal to the lower side of the antenna array and to reflect the signal incident from the front to the upper side of the antenna array so that it is not reflected to the antenna array. In this case, there is an effect of compensating for the imperfection of the directional antenna and reducing the source of interference.

Figure 21:
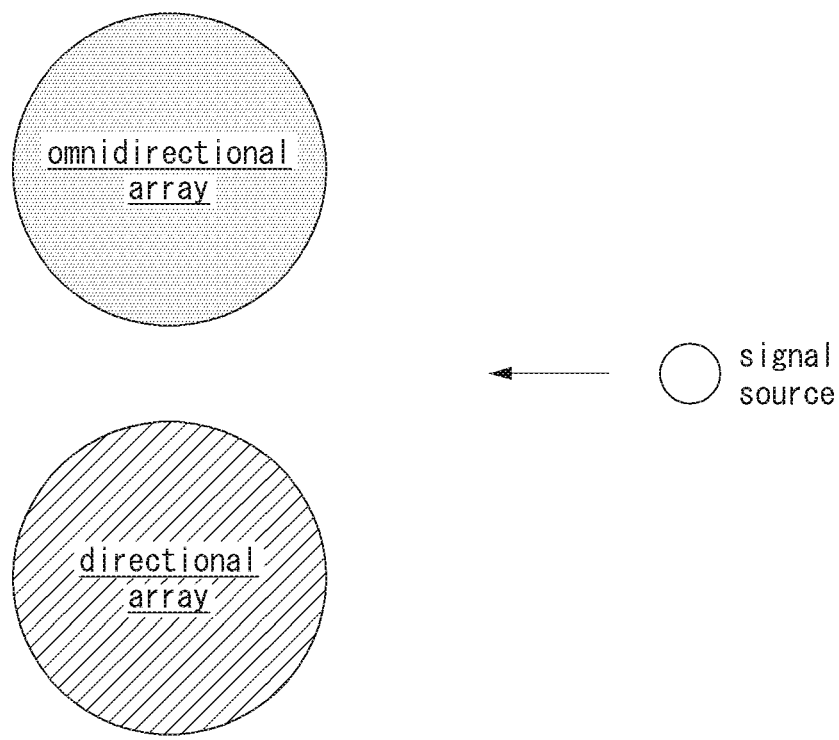
FIG. 21 is a conceptual diagram illustrating a structure in which an omnidirectional array and a directional array are arranged parallel to a directing direction, as an antenna array that can be employed in a directive direction finding apparatus according to another embodiment of the present disclosure.
Figure 22:
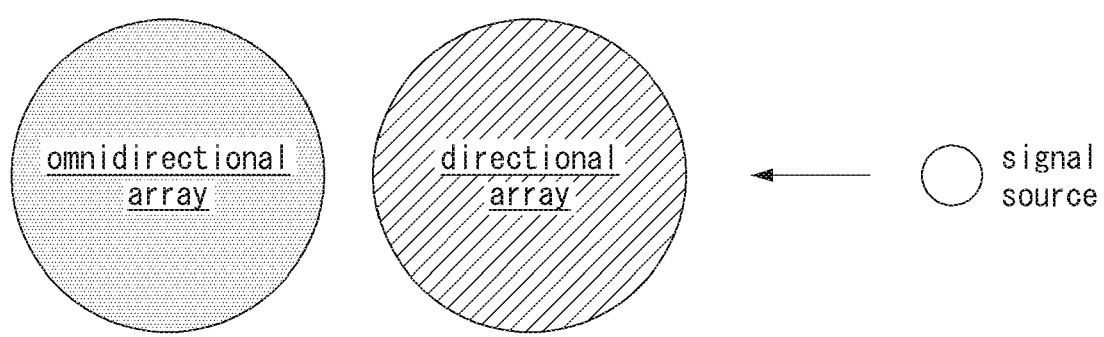
FIG. 22 is a conceptual diagram illustrating a structure in which a directional array is disposed in front of an omnidirectional array in the direction of the signal source, as an antenna array that can be employed in a directional direction finding apparatus according to another embodiment of the present disclosure.
Figure 23:
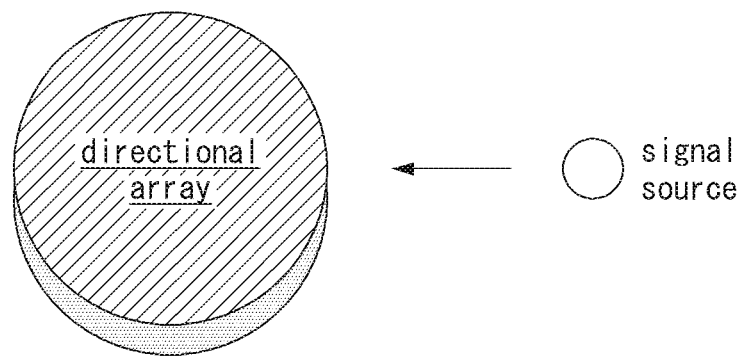
FIG. 23 is a conceptual diagram illustrating a structure in which an omnidirectional array and a directional array are three-dimensionally arranged with a reflector, as an antenna array that can be employed in a directional direction finding apparatus according to another embodiment of the present disclosure.
Figure 24:
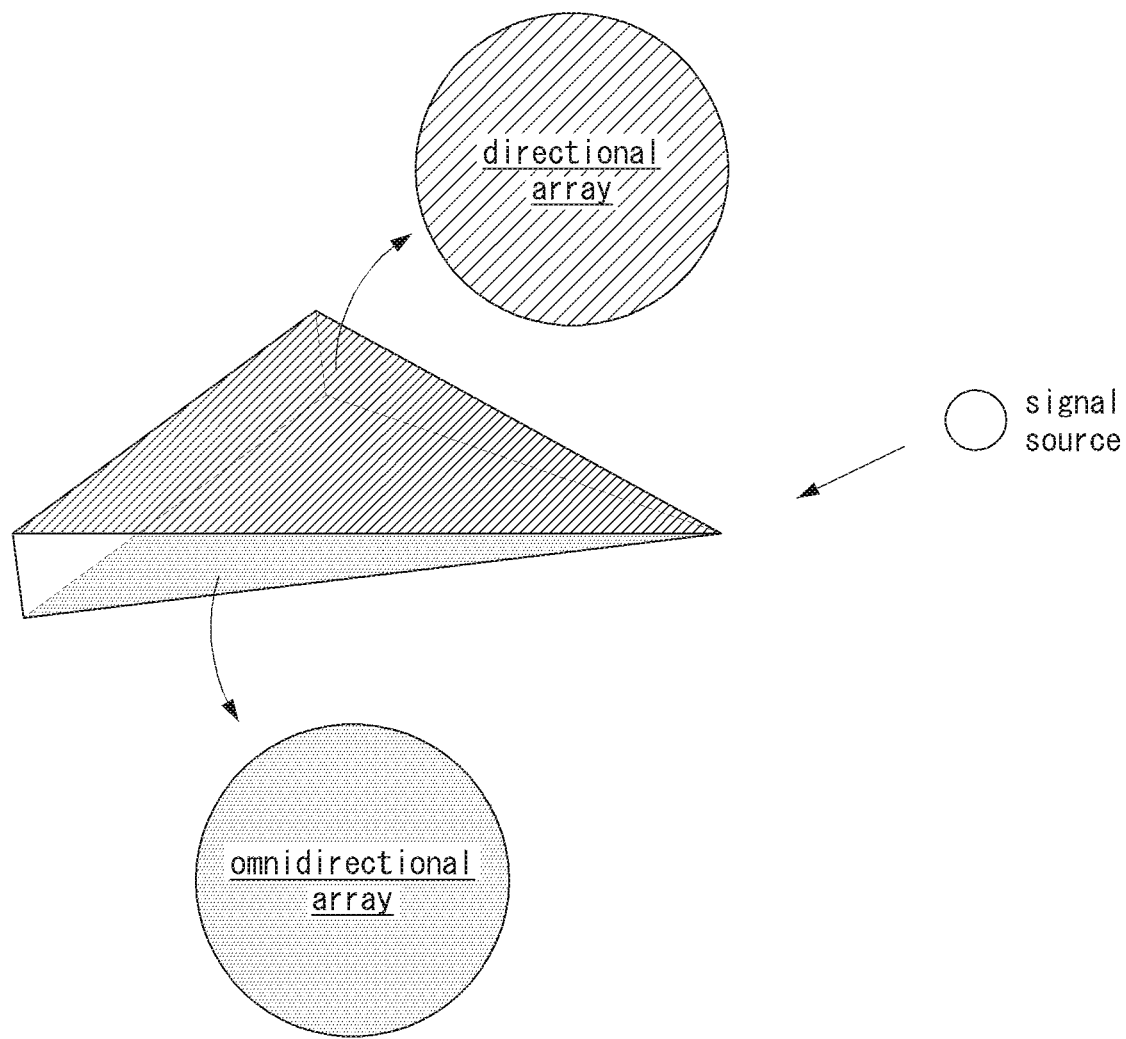
FIG. 24 is a conceptual diagram illustrating a structure in which an omnidirectional array and a directional array are overlapped, as an antenna array that can be employed in a directional direction finding apparatus according to another embodiment of the present disclosure.

FIG. 21 is a conceptual diagram illustrating a structure in which an omnidirectional array and a directional array are arranged parallel to a directing direction, as an antenna array that can be employed in a directive direction finding apparatus according to another embodiment of the present disclosure. FIG. 22 is a conceptual diagram illustrating a structure in which a directional array is disposed in front of an omnidirectional array in the direction of the signal source, as an antenna array that can be employed in a directional direction finding apparatus according to another embodiment of the present disclosure. FIG. 23 is a conceptual diagram illustrating a structure in which an omnidirectional array and a directional array are three-dimensionally arranged with a reflector, as an antenna array that can be employed in a directional direction finding apparatus according to another embodiment of the present disclosure. FIG. 24 is a conceptual diagram illustrating a structure in which an omnidirectional array and a directional array are overlapped, as an antenna array that can be employed in a directional direction finding apparatus according to another embodiment of the present disclosure.

Referring to FIGS. 21 to 24, the directive direction finding apparatus may use an omnidirectional antenna array (briefly referred to as omnidirectional array) together with a directional antenna array (briefly referred to as directional array).

In other words, even if direction finding is performed directionally, primary analysis may be required for main information such as the presence or absence of a target signal through a signal received from an omnidirectional direction. Accordingly, tracking, such as analysis or similarity comparison of a detection target signal, can be performed by using an omnidirectional reference or monitoring antenna at the same time while using the directive direction finding technique.

For example, as shown in FIG. 21, the omnidirectional array and the directional array are arranged side by side or in parallel with respect to a signal source at a similar position, so that omnidirectional direction finding and directive direction finding can be alternately performed through antenna switching.

In addition, as shown in FIG. 22, the omnidirectional array and the directional array may be arranged in a line or series with respect to a signal source at a similar position, so that omnidirectional direction finding and directive direction finding may be simultaneously, sequentially or selectively performed through antenna switching.

FIGS. 21 and 22 above may respectively correspond to a lateral arrangement structure and a longitudinal arrangement structure with respect to the front of the vehicle in a direction finding system such as a vehicle. In this case, if there is a signal source on the front side of the vehicle in the lateral arrangement structure of FIG. 21, it may correspond to the structure of FIG. 22, and vice versa.

In addition, as shown in FIG. 23, it is also possible to overlap the omnidirectional array and the directional array and simultaneously perform direction finding through an independent system.

In addition, as shown in FIG. 24, by arranging a base having an inclined surface between the omnidirectional array and the directional array, the signal from the signal source is configured to be incident on the directional array or the omnidirectional array, and through this, direction finding can be performed.

The directive direction finding is effective in improving the reliability of direction finding by reducing the number of target groups and performing precise direction finding when the existing omnidirectional direction finding alone does not provide sufficient results because there are many target signal groups.

As described above, while conducting direction finding for a signal incident on an omnidirectional array, using a directional array in certain situations may have the effect of compensating for the limitation caused by space limitations due to directivity. That is, the directional array and the omnidirectional array can be arranged and used at the same time, and the antenna array can be selected and used simply through a switch.

In addition, when the antenna array is used in a shared manner, it is possible to implement both methods of an omnidirectional array and a directional array according to the situation or condition.

The above-described directional array and omnidirectional array may be configured in the same arrangement or form, and among the two, it is also possible to design and use a receiver and a direction finder in response to an array requiring a large number of receiver channels. In addition, it is easy to use for hand-held equipment and the like and can be three-dimensionally arranged to minimize interference between antenna devices.

Figure 25A:
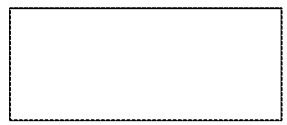
FIGS. 25A to 25C are conceptual diagrams illustrating multidirectional antenna modules that can be employed in a directive direction finding apparatus according to another embodiment of the present disclosure.
Figure 25B:
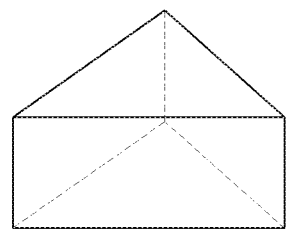
Figure 25C:
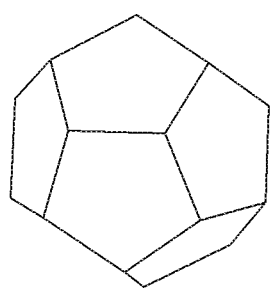
Figure 26:
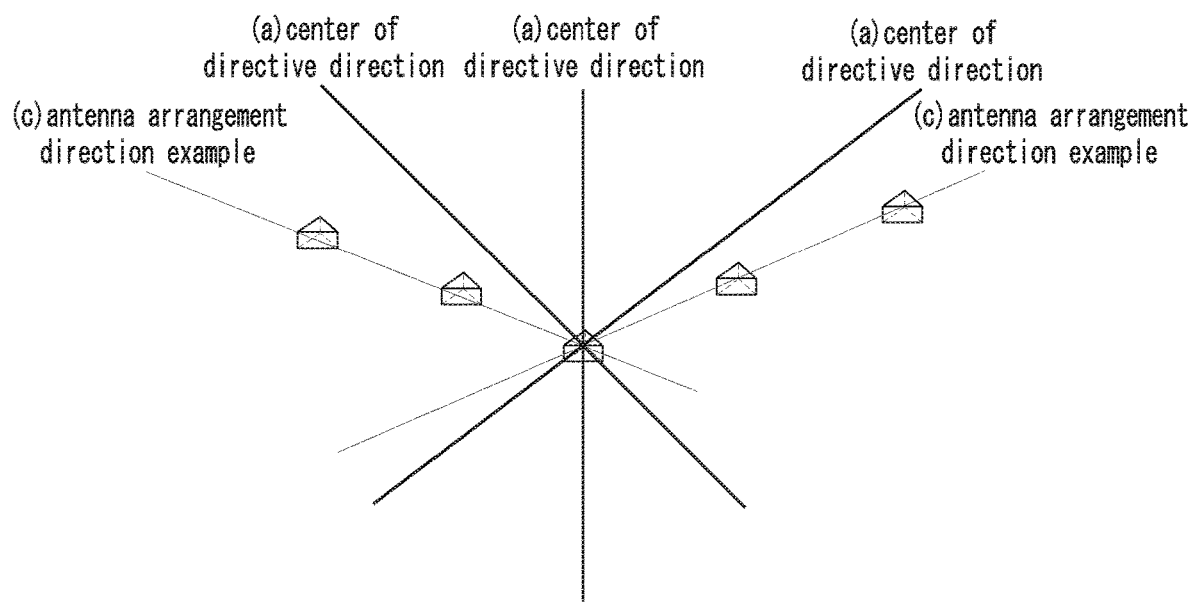
FIG. 26 is a conceptual diagram illustrating an arrangement method in the multidirectional antenna modules of FIGS. 25A to 25C in which the center of the directivity direction of the antenna and the arrangement direction of the antenna do not overlap.

FIGS. 25A to 25C are conceptual diagrams illustrating multidirectional antenna modules that can be employed in a directive direction finding apparatus according to another embodiment of the present disclosure. FIG. 26 is a conceptual diagram illustrating an arrangement method in the multidirectional antenna modules of FIGS. 25A to 25C in which the center of the directivity direction of the antenna and the arrangement direction of the antenna do not overlap.

Referring to FIGS. 25A to 25C, the directive direction finding apparatus may be configured to secure multi-directionality by configuring one antenna module constituting the directional antenna array as a multidirectional module.

A multidirectional module may include a two-dimensional (2D) multidirectional module capable of outputting simultaneously with switching (refer to FIG. 25B), or a multi-dimensional multidirectional module (refer to FIG. 25C) capable of outputting simultaneously with switching. Such a multidirectional module may have a two-dimensional or three-dimensional structure compared to the single-directional module shown in FIG. 25A.

If the multidirectional module is used, 2D omnidirectional can be realized without physical movement, and there is an advantage that tilt of a certain height can be achieved without physical orientation.

On the other hand, in the case of a multidirectional module, in order to arrange the multidirectional module or a multidirectional antenna module corresponding thereto to fit the target direction finding range, a method of arranging the antenna so that the center (a) of the directive direction of the antenna and the antenna arrangement direction (c) do not overlap each other may be used, as shown in FIG. 26.

Figure 27:
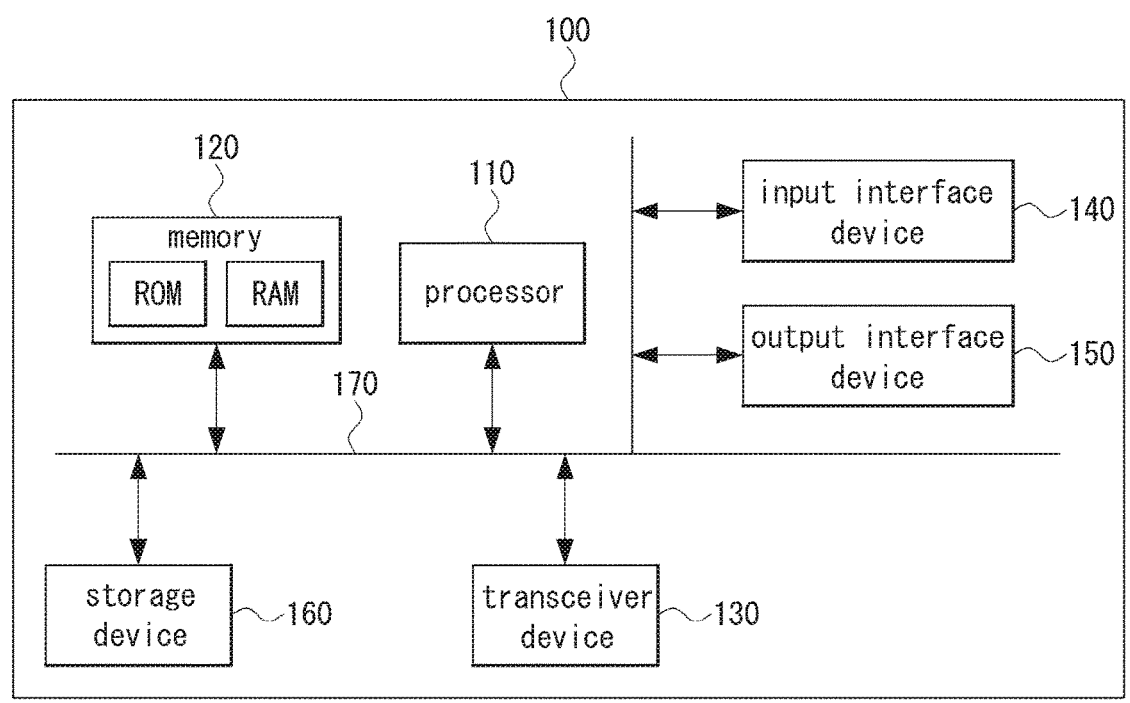
FIG. 27 is a block diagram for explaining a main configuration of a directive direction finding apparatus according to another embodiment of the present disclosure.

FIG. 27 is a block diagram for explaining a main configuration of a directive direction finding apparatus according to another embodiment of the present disclosure.

Referring to FIG. 27, a directive direction finding apparatus 100 may include at least one processor 110 and a memory 120. Also, the directive direction finding apparatus 100 may further include a transceiver device 130 connected to a network to perform communication. Also, the directive direction finding apparatus 100 may further include an input interface device 140, an output interface device 150, a storage device 160, and the like. Each of the components included in the directive direction finding apparatus 100 may be connected by a bus 170 to communicate with each other.

The processor 110 may execute a program command stored in at least one of the memory 120 and the storage device 160. The processor 110 may refer to a central processing unit (CPU), a graphics processing unit (GPU), or a dedicated processor on which methods according to embodiments of the present disclosure are performed.

Each of the memory 120 and the storage device 160 may be configured of at least one of a volatile storage medium and a non-volatile storage medium. For example, the memory 120 may be configured as at least one of a read only memory (ROM) and a random access memory (RAM).

The transceiver device 130 may include a sub-communication system supporting a communication connection with a satellite, a sub-communication system supporting wired or wireless communication with a general-purpose base station, or a sub-communication system for the connection of ideal backhaul link or non-ideal backhaul link with a mobile edge core network or a core network. Here, the transceiver device 130 may include a directional antenna array and an antenna base for changing a physical spatial arrangement of the directional antenna array.

The input interface device 140 may include at least one selected from input means such as a keyboard, a microphone, a touchpad, and a touch screen and an input signal processing unit that maps or processes a signal input through at least one input means with a prestored command.

The output interface device 150 may include an output signal processing unit that maps or processes the signal output according to the control of the processor 110 with a prestored signal type or level, and at least one output means for outputting a signal or information in the form of vibration or light according to the signal of the output signal processing unit. The at least one output means may include at least one selected from output means such as a speaker, a display device, a printer, an optical output device, and a vibration output device.

In addition, the program command executed by the processor 110 may include a tilt up command of the antenna base, a tilt down command of the antenna base, a selection command of a directional array or an omnidirectional array, and the like.

According to the present disclosure, in an environment of simultaneous incidence of multiple signal sources requiring high processing performance, that is, in an environment where it is difficult for an existing general direction finding system to perform accurate direction finding, while using a system configuration similar to that of the existing general direction finding system, it is possible to overcome the variability of the wireless channel environment, and effectively find direction in a situation where simultaneous users of a shared frequency band exist or a situation where signals shorter than the finding time coexist.

In addition, according to the present disclosure, by implementing a directive direction finding apparatus through a directional antenna array, a combination of a directional antenna array and an omnidirectional antenna array, and spatial arrangement of a directional antenna array, it is possible to effectively find the direction of a specific frequency radio signal in an environment of simultaneous incidence of multiple signal sources.

The exemplary embodiments of the present disclosure may be implemented as program instructions executable by a variety of computers and recorded on a computer-readable medium. The computer-readable medium may include a program instruction, a data file, a data structure, or a combination thereof. The program instructions recorded on the computer-readable medium may be designed and configured specifically for the present disclosure or can be publicly known and available to those who are skilled in the field of computer software.

Examples of the computer-readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A directive direction finding apparatus, comprising:
a directivity-enabled antenna array including a plurality of directional antennas, each having directivity in a same direction, the directivity-enabled antenna array being configured to spatially limit signal sources incident from the same direction in order to reduce interference and to enable direction finding with a relatively small number of receiver channels;
an RF/IF receiver connected to the directivity-enabled antenna array;
a digital receiver connected to the RF/IF receiver;
a direction finder connected to the digital receiver;
a directivity control unit configured to control an operation of the directivity-enabled antenna array; and
a transport/control interface connected to the direction finder and to manage control and operation of the directivity-enabled antenna array, the RF/IF receiver, the digital receiver, the direction finder and the directivity control unit,
wherein the directivity control unit includes a first buffer distributor disposed between a plurality of subarrays and a plurality of receivers, the first buffer distributor being connected to a plurality of single antennas and configured to convert analog signals to digital signals.

2. The directive direction finding apparatus according to claim 1, wherein the directivity control unit performs at least any one or more of direction control of the directivity-enabled antenna array, directivity control of an individual directivity antenna element of the directivity-enabled antenna array, and frequency selection control of the directivity-enabled antenna array to limit direction finding space.

3. The directive direction finding apparatus according to claim 1, wherein the directivity control unit performs at least any one or more of direction control of the directivity-enabled antenna array, directivity control of an individual directivity antenna element of the directivity-enabled antenna array, and frequency selection control of the directivity-enabled antenna array to target and track a specific signal source in an entire detection finding space.

4. The directive direction finding apparatus according to claim 1, wherein the directivity-enabled antenna array includes a plurality of shared subarrays, each subarray of the plurality of shared subarrays including a plurality of directional antennas.

5. The directive direction finding apparatus according to claim 4, wherein the directivity control unit further includes a switch matrix connected between a plurality of single antennas and a plurality of subarray modules, the switch matrix supporting multiple subarrays to share at least some single antennas.

6. The directive direction finding apparatus according to claim 4, wherein the directivity control unit further includes a second buffer distributor disposed between the plurality of subarrays and a plurality of direction finding modules.

7. The directive direction finding apparatus according to claim 4, wherein the directivity control unit is a signal processing unit for the directivity-enabled antenna array, and includes a phase control unit and a signal integrator for controllable directivity.

8. The directive direction finding apparatus according to claim 7, wherein the directivity control unit disposes antennas for different frequencies of several bands for simultaneous support of various frequency bands in the subarray, and further includes a frequency controller for selecting at least one or more of the antennas.

9. The directive direction finding apparatus according to claim 1, further comprising an antenna base for slantingly arranging a plurality of rows formed by single antennas of the directivity-enabled antenna array.

10. The directive direction finding apparatus according to claim 9, wherein the antenna base includes a triangular pyramid shape, a quadrangular pyramid shape or a cone shape.

11. The directive direction finding apparatus according to claim 1, further comprising an omnidirectional antenna array disposed adjacent the directivity-enabled antenna array.

12. The directive direction finding apparatus according to claim 11, wherein the directivity-enabled antenna array and the omnidirectional antenna array are arranged to face parallel to a signal source positioned in a direction limited to a direction finding space.

13. The directive direction finding apparatus according to claim 12, further comprising a reflector disposed between the directivity-enabled antenna array and the omnidirectional antenna array.

14. The directive direction finding apparatus according to claim 11, wherein the directivity-enabled antenna array and the omnidirectional antenna array are arranged in a row or overlapping with regard to a signal source positioned in a direction limited to a direction finding space.

15. The directive direction finding apparatus according to claim 14, further comprising a reflector disposed adjacent to the directivity-enabled antenna array to reflect a radio signal in an undesired direction to an outside.

16. The directive direction finding apparatus according to claim 1, further comprising a driving means which is connected to the directivity-enabled antenna array and which tilts the directivity-enabled antenna array in a vertical direction or rotates the directivity-enabled antenna array in a horizontal direction, the driving means including an actuator or motor.

17. The directive direction finding apparatus according to claim 1, wherein the directivity-enabled antenna array includes a multidirectional antenna module as a single antenna.

18. A directive direction finding method performed by a directive direction finding apparatus, comprising the steps of:

disposing a directivity-enabled antenna array including a plurality of directional antennas, each having directivity in a same direction, the directivity-enabled antenna array being configured to spatially limit signal sources incident from the same direction in order to reduce interference and to enable direction finding with a relatively small number of receiver channels;

controlling the directivity-enabled antenna array to direct a specific direction finding space among an entire direction finding space; and processing, by a directivity control unit, a specific frequency radio signal incident in the specific detection finding space to find a direction of the signal, wherein the directivity control unit includes a first buffer distributor disposed between a plurality of subarrays and a plurality of receivers, the first buffer distributor being connected to a plurality of single antennas and configured to convert analog signals to digital signals.

* * * * *